(12) United States Patent
Wroblewski et al.

(10) Patent No.: US 7,798,373 B1
(45) Date of Patent: Sep. 21, 2010

(54) AIRPOT BEVERAGE DISPENSER AND METHOD

(75) Inventors: Leszek M. Wroblewski, Lake Forest, IL (US); Bartosz Sokolski, Elmwood Park, IL (US); Michael W. Lassota, Wauconda, IL (US); Christopher P. Michalek, Lake Zurich, IL (US); Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 1219 days.

(21) Appl. No.: 10/999,283

(22) Filed: Nov. 30, 2004

Related U.S. Application Data

(63) Continuation-in-part of application No. 09/931,687, filed on Aug. 16, 2001, now Pat. No. 6,741,180.

(60) Provisional application No. 60/278,839, filed on Mar. 26, 2001.

(51) Int. Cl.
*B65D 37/00* (2006.01)

(52) U.S. Cl. .................. 222/209; 222/1; 222/23; 222/54; 222/64; 222/131; 222/146.5; 222/401; 99/280; 99/285

(58) Field of Classification Search .......... 222/1, 222/23, 25–26, 28, 52, 54, 64, 129, 131, 222/146.5, 209, 401, 630–633, 475.1; 99/280, 99/285, 302 R, 302 FB
See application file for complete search history.

(56) References Cited

U.S. PATENT DOCUMENTS

| | | | | |
|---|---|---|---|---|
| 3,905,520 A | 9/1975 | Nishioka | | 222/209 |
| 4,174,053 A | 11/1979 | Shimizu | | 222/209 |
| 4,290,537 A * | 9/1981 | Chi-Jung | | 222/25 |
| 4,300,705 A * | 11/1981 | Shy | | 222/131 |
| 4,310,104 A * | 1/1982 | Takatsuki | | 222/131 |
| 4,359,174 A * | 11/1982 | Ikunosuke et al. | | 222/131 |

(Continued)

*Primary Examiner*—Frederick C. Nicolas
(74) *Attorney, Agent, or Firm*—James W. Potthast; Potthast & Associates

(57) ABSTRACT

An airpot beverage dispenser (10) having a composite dispense tube (40) with an exterior outlet (44) adjacent a top of a hollow body (20) and an interior inlet (110) located adjacent a bottom (16) for passing beverage (36) from adjacent the bottom (16) to the outlet when the interior of the hollow body (20) is pressurized has a brew-through assembly with a cover body (24) for substantially closing the open top (18) except for a centrally located brew-through passageway (95) substantially smaller than the open top (18) and extending between an upwardly facing exterior brew-through inlet (30) and an interior outlet (102) that passes through a central passageway extending through a double-walled bellows (74) or extends past a plurality of bellows (FIG. 16, 114) that are laterally spaced from the passageway has an electronic display (48) for indicating a plurality of levels of the beverage (36) within the hollow body and a resistive (FIGS. 11-14) or capacitive (FIG. 21) electronic level sensing assembly carried by the dispense tube (40) for sensing a plurality of different levels of beverage (36) within the hollow body and electrical leads (170, 172) printed on the dispense tube to pass the sensing signals to a display controller (127). The display, controller and portable power source (123) are protectively contained within a plastic watertight compartment (126) integrally formed with the cover body (24) is vented (FIG. 20) to prevent the accumulation of moisture within the compartment (126).

96 Claims, 13 Drawing Sheets

U.S. PATENT DOCUMENTS

| | | | |
|---|---|---|---|
| 4,386,556 A * | 6/1983 | Romey, Sr. | 99/290 |
| 4,517,445 A * | 5/1985 | Tatsumi et al. | 392/444 |
| 4,622,889 A * | 11/1986 | Chappell et al. | 99/312 |
| 4,986,452 A * | 1/1991 | Takatsuki et al. | 222/209 |
| 4,993,593 A * | 2/1991 | Fabiano et al. | 222/1 |
| 5,887,760 A * | 3/1999 | Johnson | 222/209 |
| 6,105,809 A * | 8/2000 | Yamanaka | 220/326 |
| 6,119,900 A * | 9/2000 | Iwamoto et al. | 222/209 |
| 6,741,180 B2 * | 5/2004 | Lassota | 340/622 |

* cited by examiner

AIRPOT BEVERAGE DISPENSER AND METHOD

CROSS-REFERENCE TO RELATED APPLICATIONS

This application is a continuation-in-part of, and claims under 35 USC 120 the benefit of U.S. patent application Ser. No. 09/931,687 filed Aug. 16, 2001, now U.S. Pat. No. 6,741,180 issued May 25, 2004, which, in turn, claims under 35 U.S.C. 119(e) the benefit of provisional application Ser. No. 60/278,839 filed Mar. 26, 2001.

BACKGROUND OF THE INVENTION

1. Field of the Invention

This invention generally relates to airpot beverage dispensers and methods of serving beverages, such as freshly brewed coffee, iced tea, lemonade, ice water, hot water and the like, from airpot beverage dispensers.

2. Discussion of the Prior Art

Airpot beverage dispensers of the type that have a insulated hollow body for storage of beverage and a pressurization system for forcing beverage to travel up a feed tube within the hollow body to a spout at the end of an open feed tube outside of the hollow body. Typically, the bellows is mounted within a cover assembly to which is also movably mounted a bellows actuator in the form of a pivotally attached lever or a push button that pushes on the top of a bellows to force air into the hollow body. When the bellows is actuated, the pressure within the hollow body is increased relative to atmospheric pressure and this pressure differential forces the beverage up the feed tube and out of the spout. The liquid contents are displaced with pressurized atmospheric air. Examples of airpot dispensers are shown in U.S. Pat. Nos. 4,290,537 issued Sep. 22, 1981 to Chi-Jung; 5,156,297 issued Oct. 20, 1992 to Engler and 5,887,760 issued Mar. 30, 1999 to Johnson.

A relative advantage of this airpot design is that the spout is located adjacent the top to enable the location of a coffee cup, carafe or the like beneath the spout without the need to support the bottom of the hollow body above the underlying support counter. Such support is required with beverage dispensers having a gravity feed faucet located at the bottom of the hollow body. Both gravity-feed faucet type beverage dispensers and airpot dispensers both have the advantage of not requiring the entire hollow body to be lifted and tipped to pour beverage from the top of the hollow body. In both types of dispensers, the contents are prevented from developing temperature equilibrium with the ambient air and resultant degradation of the beverage by means of insulation The inventors have determined that there are two basic problems with current airpot designs. First, in all known airpot dispensers the cover that contains the bellows and carries the bellows actuator have no beverage inlets. Accordingly, the covers are designed to be movably mounted or removably mounted to the hollow bodies to enable passing beverage into hollow body through the entire uncovered open top of the hollow body. This may be done by pouring the beverage into the open top or by locating the open top beneath a faucet of a larger beverage dispenser or by locating the entire open top beneath a beverage outlet of a beverage brewer such as a fresh coffee brewer for direct brewing in to the top. This disadvantageously results in wide contact of the beverage with the room temperature ambient air and excessive loss of heat from within the hollow body by upward air convection, loss of steam and unreflected infrared radiation from the beverage flowing through the open top. This substantial heat loss continues throughout the period of filling the hollow dispenser. The filling period, in the case of filling directly from a brewer, may take 2-4 minutes, and heat loss continues thereafter until the cover of the dispenser is moved to a closed position or, if separated, is reattached to the hollow body.

In known insulated beverage dispensers of the type that drain beverage from a faucet at the bottom of an elevated hollow body, this problem of heat loss during the filing process has been reduced. In such case, in which the covers have no bellows blocking passage between the top of the cover and the interior of the hollow body, heat loss is reduced during the filling period by providing a fixedly mounted insulated cover with a relatively small inlet opening that may interface closely with a beverage outlet of a beverage brewer. However, because of known bellows designs, this approach has never been applied to air pots.

The other problem with known airpot dispensers is that they lack any reliable and hygienic means for determining the amount of beverage remaining in the airpot hollow body after serving has commenced. The insulated hollow bodies are insulated and are opaque and thus the level of the beverage within the hollow body is not visible from outside the body. In known airpot dispensers that are commercially available, the only way to determine the level of beverage within the hollow body is to open or remove the cover and look down into the open top of the insulated hollow body. Disadvantageously, this results in substantial heat loss through the open top and a resultant reduction in the serving temperature of the beverage, as explained above.

In the aforementioned U.S. Pat. No. 4,290,537 of Chi-Jung a mechanical float mounted for movement within the hollow body is mechanically linked to a level indicator, but in addition to being mechanical, the mechanical display of level faces upwardly only and disadvantageously cannot be seen from the side and thus cannot be seen from any significant distance. Similarly, a mechanical thermometer display is only located on the cap and only faces upwardly. In addition, the thermometer only measures the temperature of the steam within the hollow body above the surface of the beverage and does the actually directly measure the temperature of the beverage, itself. Moreover, undesirably, the cover is designed to be moved to enable filling of the hollow body through its open top and movement can only result in possible damage to the mechanical measuring devices and can only contribute to their inherent unreliability due to mechanical wear and tear.

SUMMARY OF THE INVENTION

In accordance with the present invention, the aforementioned problems of known airpot dispensers are overcome or alleviated by providing an airpot one or both of a fixedly attached brew-through cover and an electronic display for electronically indicating beverage level and associated methods of brewing and serving beverage.

This objective is achieved in part by providing an airpot beverage dispenser with an insulated hollow body having, a bottom, a top and a surrounding sidewall joining the top to the body, a spout and a feed tube with an outlet connected to the spout within the insulated body and an inlet located adjacent the bottom for passing beverage from adjacent the bottom to the spout, with a brew-through assembly having a cover assembly mounted to the top and having a cover and carrying a bellows and a bellows actuation linkage, and a bellows actuation member lever with a brew-through inlet opening for direct passage of freshly brewed beverage directly into the hollow insulated body, said bellows actuation member being mounted to the cover body for relative movement between a brew position in which the brew-though opening is facing substantially upwardly for direct receipt of freshly brewed beverage when the insulated body is located at a direct brew position of a brewer, and a plurality of pumping positions spaced from the direct brew position, said bellows actuation member being attached to the bellows actuation linkage to translate movement between said plurality of pumping positions to pumping movement of the bellows to pump air into the insulated body.

The objective is also achieved by providing an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, with an electronic beverage level indicator having a cover assembly with a cover carrying the bellows and a bellows actuator, an electronic display for indicating the level of the beverage within the hollow body, an electronic level sensing assembly for sensing a plurality of different levels of beverage within the hollow body, and means for linking the electronic level sensing assembly to the electronic level display.

Also, the objective is obtained by providing an airpot beverage dispenser with an insulated hollow body having, a bottom, an open top and a surrounding sidewall joining the open top to the bottom, a laterally extending, downwardly facing spout outside of the hollow body, and a feed tube with an outlet connected to the spout and an inlet within the hollow body and located adjacent the bottom for passing beverage from adjacent the bottom to the spout, with a brew-through assembly having a cover assembly mounted to the top of the hollow body and having a cover with an upwardly facing cover top and a bellows compartment having a bottom spaced beneath the cover top and protectively enclosing the bellows, an upwardly facing brew-through beverage inlet opening extending through the cover top and having a size substantially less than that of the top of the hollow body, and a beverage inlet passageway connected to the inlet opening and extending through the cover to a beverage outlet opening in the bottom for direct passage of freshly brewed beverage from the inlet beverage inlet through the beverage outlet and to within the hollow insulated body.

Additionally, the objective is partly achieved by providing an airpot beverage dispenser with an insulated hollow body having, a bottom, an open top and a surrounding sidewall joining the open top to the bottom, a laterally extending, downwardly facing spout outside of the hollow body and a feed tube with an outlet connected to the spout and an inlet within the hollow body and located adjacent the bottom for passing beverage from adjacent the bottom to the spout, with a cover assembly mounted to the open top of the hollow body and including an upwardly facing brew-through beverage inlet passageway passing through the cover and having an upwardly facing beverage inlet substantially smaller than that of the open top of the hollow body, and a feed tube and connected spout fixedly carried by the cover assembly at a location laterally spaced from the brew-through beverage inlet passageway, and means for permanently mounting the cover assembly to top of the hollow body.

The objective is also acquired by providing method of serving freshly brewed beverage from an airpot, by performing the steps of, locating the airpot at a brew position with a brew-through inlet opening in an upper most surface of a closed cover assembly of the airpot positioned adjacent to and aligned with a beverage outlet of brewer to directly receive freshly brewed beverage into the airpot, passing beverage from the beverage outlet directly into a hollow body of the airpot through the brew-through inlet opening in the closed cover while the cover is closed, and serving beverage at the serving location from a spout located outside of the hollow body and connected with a feed tube within the hollow body by actuating a bellows to relatively pressurize the hollow body.

Achieving the objective is also done by providing a method for use in an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, for electronically displaying an actual condition of the beverage within the hollow body, by performing the steps of, closing the open top of the hollow body assembly with a cover assembly carrying a bellows and a bellows actuator, indicating with an electronic display the level of the beverage within the hollow body, sensing with an electronic level sensing assembly a plurality of different levels of beverage within the hollow body, and linking the electronic level sensing assembly to the electronic level display.

Further, the objective is obtained in part by providing in an airpot beverage dispenser with an insulated hollow body having, a bottom, a top and a surrounding sidewall joining the top to the body, a spout and a feed tube, or siphon tube, with an outlet connected to the spout within the insulated body and an inlet located adjacent the bottom for passing beverage from adjacent the bottom to the spout, a method of serving freshly brewed beverage, by performing the steps of, keeping the open top of the hollow body substantially closed with a cover assembly mounted to the top and having a cover carrying a bellows, and moving a bellows actuation member lever with a brew-through inlet opening for direct passage of freshly brewed beverage directly into the hollow insulated body to a brew position in which the brew-though opening is facing substantially upwardly for direct receipt of freshly brewed beverage from a beverage outlet of a brewer, passing freshly brewed beverage from the beverage brewer through the brew-through inlet opening when the actuation member is in the brew position, after the step of passing, serving beverage out of the spout by moving the actuation member between the direct brew position and at least one pumping position to pressurize the insulated hollow body to force beverage upwardly through the feed-tube and out of the spout.

BRIEF DESCRIPTION OF THE DRAWINGS

The foregoing advantageous features will be described, in greater detail, and further advantageous features will be made apparent from the following detailed description that is given with reference to the several figures of the drawings, in which.

DETAILED DESCRIPTION

Figure 1:
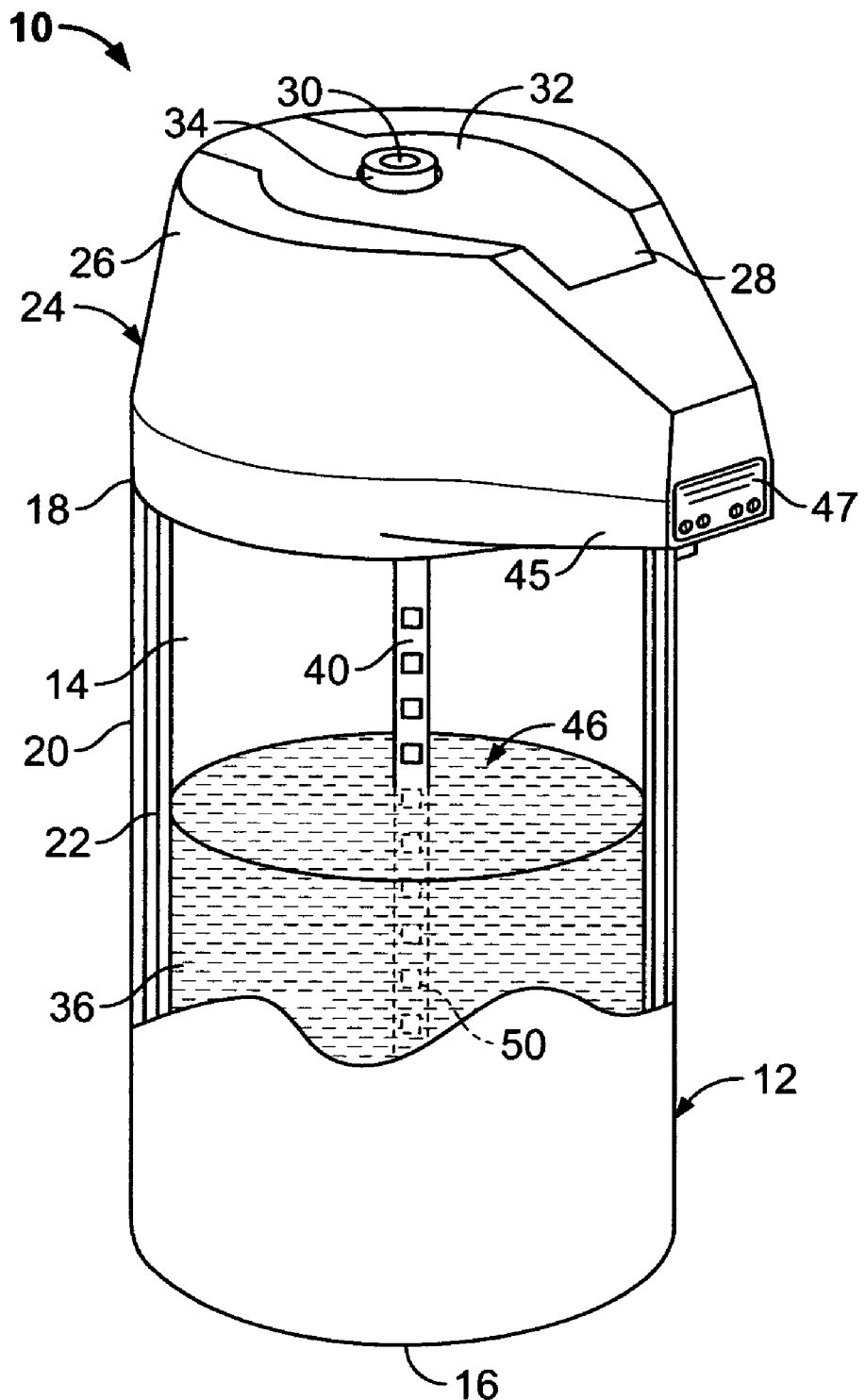
FIG. 1 is a perspective view of an embodiment of the airpot dispenser of the present invention with portions broken away to shown interior features.
Figure 2:
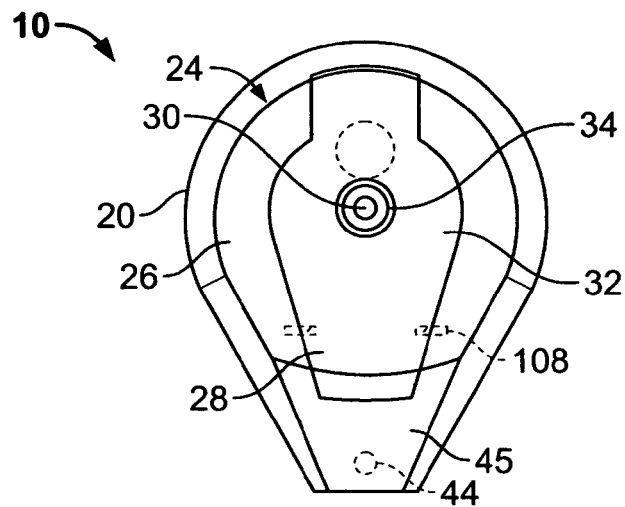
FIG. 2 is a plan view of the airpot beverage dispenser of FIG. 1.
Figure 3:
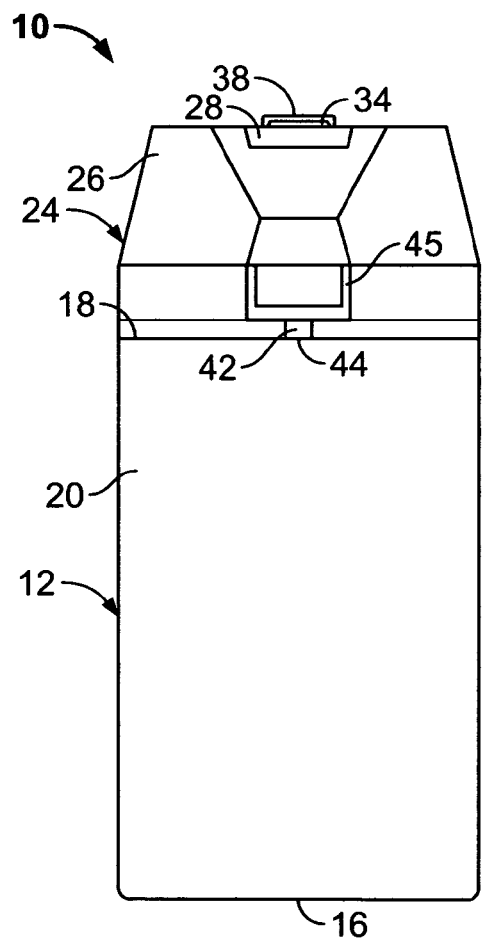
FIG. 3 is a side elevation view of the airpot beverage dispenser of FIGS. 1 and 2.

Referring now to FIGS. 1, 2 and 3, one embodiment of the airpot beverage dispenser 10 of the present invention has an insulated hollow body 12 having an interior 14 defined by a circular bottom 16, a circular open top 18 and a surrounding cylindrical sidewall 20 joining the top 18 to the bottom 16. The cylindrical sidewall 20 and the bottom 16 preferably have a double-walled construction of stainless steel with an evacuated gap 22 provided for insulation. The open top 18 is closed by a cover assembly 24 with fixed cover 26 and a movably cover member, or movably mounted cover, 28. A brew-through beverage inlet opening 30 in the movable cover member 28 is surrounded by an upraised collar 34. The cover body 24 substantially closes the open top 18 except for the brew-through inlet opening 30 that is substantially smaller than the open top 18. The relatively small size of the brew-through inlet reduces loss of heat from the beverage 14 during the brew cycle of an associated brewer 54, FIG. 4, relative to the loss resulting from passing the beverage through a larger opening or an opening significantly larger than the brew basket outlet opening.

The collar 34 extends upwardly from the top surface 32 of the movable cover member 28 that is the uppermost surface of the airpot beverage dispenser 10. When beverage 36 is not being directly brewed through the inlet opening 30 and into the interior 14 of the hollow body 12 the inlet opening 30 is closed by a movably mounted cover 38 shown in FIG. 3.

Attached to the underside of the cover assembly 24 is a feed tube, or dispense tube, 40 with an inlet opening adjacent the bottom 16 and an outlet adjacent the top 18 that is connected to a downwardly facing exterior spout 42 with an outlet opening 44, FIG. 3. The spout outlet 44 mounted beneath a forward extending section 45 of the cover 26 is located forwardly of the cylindrical sidewall 20 to enable the location of a cup or other container to be located beneath the outlet 44. During service of beverage 36, pressure is temporarily applied to the interior 14 while a cup or other container is located beneath the outlet 44. This increased pressure forces the beverage up the dispense tube 40, into the spout 42, out of the outlet opening 44 and into the cup.

In keeping with one aspect of the invention, the dispenser 10 is provided with an electronic level sensing assembly for sensing the position of beverage surface level 46, FIG. 1, of the beverage 36 and a laterally facing, electronic display 48 responsive the electronic level sensing assembly. Preferably, the electronic level sensing assembly is mounted to the cover assembly 24 and is removably from the interior 14 when the cover assembly 24 is removed from the open top 18 to enable unfettered cleaning of the interior. Preferably, the dispense tube 40 carries one or more level sensing elements 50 for sensing the level 46 of the beverage 36.

Figure 4:
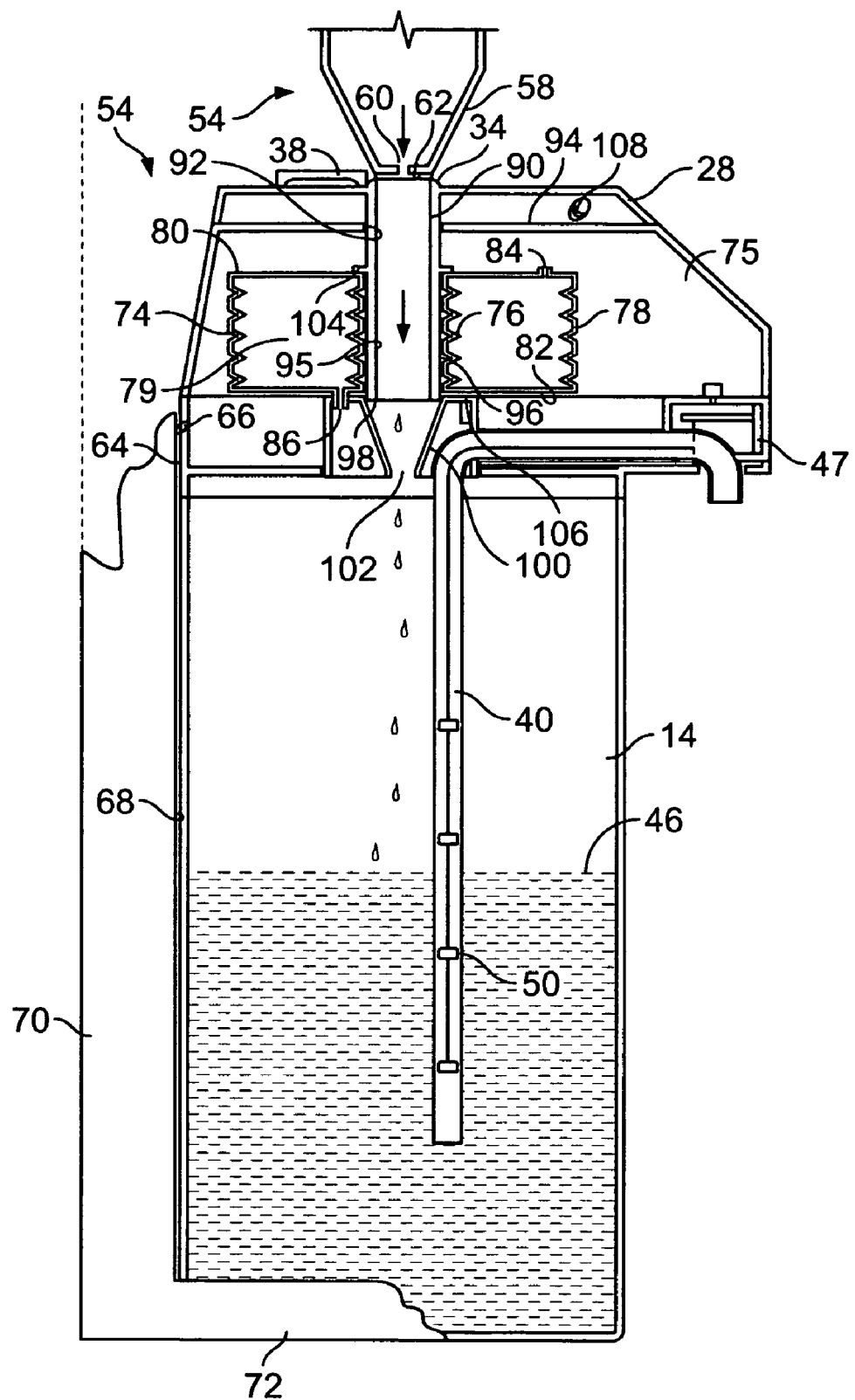
FIG. 4 is a sectional side view of the airpot beverage dispenser of FIGS. 1-3 in combination with an associated beverage brewer especially adapted to directly brew fresh beverage through the brew-through lid and with a dispenser actuator in a brew-through position to directly receive freshly brewed beverage.

Referring also to FIG. 4, when the movable cover member 28 is in the relatively lowered brew position as shown in FIGS. 1 and 4, the airpot assembly 10 may be positioned beneath a mating beverage brewer 54 that is especially adapted for brew-through brewing into the dispenser 10. The mating, associated brewer may be conventional brewer except that it supports a brew basket 58 with a brew basket drain hole 60 in the bottom 62 at a height and a rearward location that enables the dispenser 10 to be located in a brew position relative to the brewer 54. In the brew position, as shown in FIG. 4, the top of the collar 34 is located closely adjacent the bottom 62 of the brew basket 58 with the brew-through inlet opening 30 directly aligned beneath the drain hole 60. Beverage 36 is directly received from the brew basket 58 without the need for opening or removing the cover assembly 24. The dispenser may also carry a start elapsed time switch actuator 66 that is actuated by disengagement from a special aligned mating switch actuation member 64 carried at the back surface 68 of a brewer base 70. Additionally, a pair of forwardly extending, generally parallel, brewer support legs 72 that supports the brewer elements and the brew basket 58 are spaced apart relative to the width of the dispenser to laterally guide the dispenser into the correct brew position.

The cover 26 provides a protective housing or mounting for all of the elements of the dispenser except the hollow body 20. This includes an annular, double-walled bellows assembly 74 that is carried within an enclosed bellows, housing compartment 75 of the cover 26. Such a bellows assembly 74 is the preferred means for pressurizing the interior of the insulated hollow body.

Figure 7:
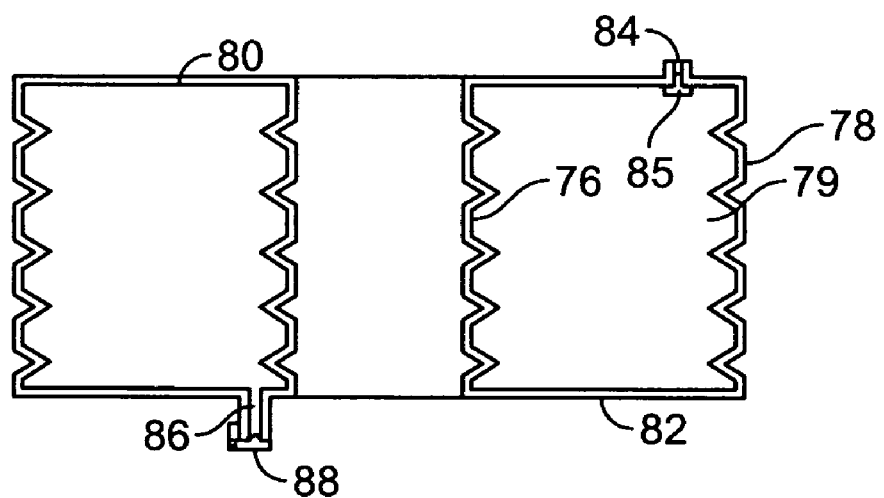
FIG. 7 is a side elevation view of the annular, double-walled bellows of FIG. 6 when in the fully extended position ready at the top of a power stroke of a pumping cycle.

The bellows assembly 74 preferably includes a double-walled, annular body with a resilient, corrugated, generally cylindrical but corrugated, or fan-folded, inner wall 76 spaced inwardly from a resilient, corrugated, generally cylindrical outer wall 78. Both of the resilient, corrugated walls 76 and 78 are of equal length and extend between and are joined in airtight relationship with a flat, relatively rigid, annular top 80 and a flat, relatively rigid, annular bottom 82 to form an interior, annular, three-dimensional space, or volume, 79. The space 79 is filled with air and has a volume that may be reduced by moving together the top 80 and bottom 82 to create pressure within the bellows interior space 79. The top 80 has an air inlet opening 84 for receipt of by "sucking in" air from atmosphere into the bellows interior space 79 when the bellows interior volume is expanded to reduce air pressure within the space 79. This air inlet opening 84 may be provided with a flap-valve, ball valve, 85, FIG. 7, or the like, that will automatically open when pressure causes air to move inwardly and will automatically close when there is opposite air pressure tending to pass air outwardly through the air inlet opening 84. The bottom has an air outlet opening 86 in communication with the interior 14 which may be provided with an outlet valve 88, which may be a flap valve, or ball valve, as seen in FIG. 7. The valves may be set to release air in the event of an over-pressure condition. In the event that the valves 85 and 88 are not provided, then the inlet opening 84 is selected to have a size that is significantly smaller than the outlet opening 86 so that more air passes out of the outlet opening 86 and into the interior 14 than passes out of the inlet opening 84 when the volume 79 of the bellows 74 is reduced.

Figure 8:
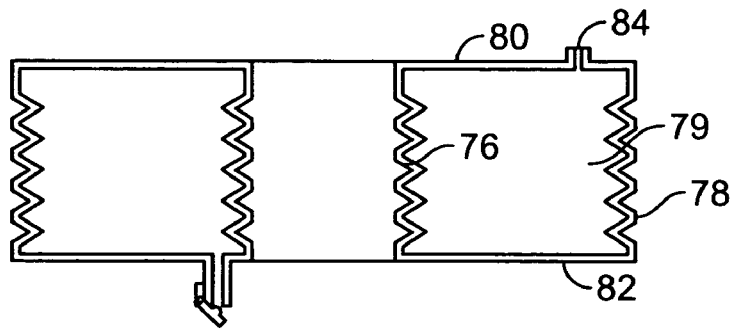
FIG. 8 is a side elevation view of the annular, double-walled bellows of FIG. 7 but when in a compressed position for brew-through operation or at the bottom of a power stroke of a pumping cycle.

In either event, when the volume 79 is reduced, pressurized air is passed through the air outlet 86 and into the portion of the interior space 14 above the beverage surface 46. When the volume of the interior space 79 of the bellows assembly 74 is reduced, as shown in FIGS. 4 and 8, air from within the interior 79 of the is passed through the outlet opening 86 and into the interior space 14 of the hollow body 12 to pressurized the interior space 14. This pressurization causes the beverage 36 to rise up the dispense tube 40 and out of the outlet spout 44 by virtue of displacement with air of an equal volume otherwise occupied by the beverage.

The bellows assembly has a bellows actuator carried by the movable cover and linked to the top 84 of the bellows body for pressing the top 84 to move downwardly toward the bottom 82 to distort the bellows 74 to pressurize the interior of the hollow body. Preferably, the bellows actuator includes an elongate tubular member 90 attached to the underside of, and extending downwardly from, the movable cover member 28 for snug sliding movement within mounting hole 92 which is also an inlet opening to the interior 14. The upper open end of the tubular member 90 carries the collar 34 defines the exterior brew-through inlet 30. The cylindrical body 95 extends downwardly through a passageway 96 through the bellows 74 defined by the interior wall 76 of the annular, double walled bellows 74. When the movable cover member 28 is in the brew-through position, shown in FIG. 4, an outlet end 98 of the tubular member mates 90 with the relatively wide inlet of an internal funnel member 100. The funnel member 100 has a relatively narrow outlet 102 extending into, and in fluid communication with, the interior 14.

The cylindrical body 95 carries a laterally extending, preferably annular, bellows engagement member 104 that has a lateral extent greater than the diameter of the passageway 96 at the top 80 of the bellows and thus cannot pass beneath the top 80. When the movable cover 28 is moved to the brew-through position shown in FIG. 4, the collar is pressed against the top 80 and is pushed downwardly toward the bottom 82 to provide the bellows with a reduced volume, as shown in FIGS. 4 and 8. The bottom 82 is supported against movement by engagement with a bottom support surface 106, and the outlet 98 of the tubular body 95 being pressed into the inlet of the funnel 100. The tapered, conical sides of the funnel laterally guides the outlet end 98 of the cylindrical body 95 into mating engagement with the interior side walls of the funnel 100. The bellows 74 is in resilient compression in the reduced volume configuration and resilient presses upwardly against the collar 104 and thereby tends to move the movable cover member 28 to the relatively elevated position shown in FIG. 5, but is prevented from rising to this elevated position by the bottom 62 of the brew basket 58. Instead, the top of the collar 34 is pressed against the bottom 62 of the brew basket to provide a snug fit. Before being slid beneath the brew basket 58, the movable cover member 28 is held in the lowered position, and then once in the brew position with the inlet aligned vertically beneath the drain hole 60 the movable cover 28 is released to rise until the top of the collar 34 is pressed against the bottom 62 of the brew basket 58.

Otherwise, or when the airpot dispenser is beneath the brew basket, the movable cover member may be held in the brew position by means of suitable releasably latches 108. Such latches 108 may be formed of a pair of laterally extending, spring loaded, slidably mounted, pins that extend from opposite sides of the movable cover member 28 into mating pin receptacles within the upstanding vertical wall extending between the relatively lower central section 94 within which the movable cover 28 is received and the uppermost surface of the relatively higher section of the fixed cover member 26.

Figure 5:
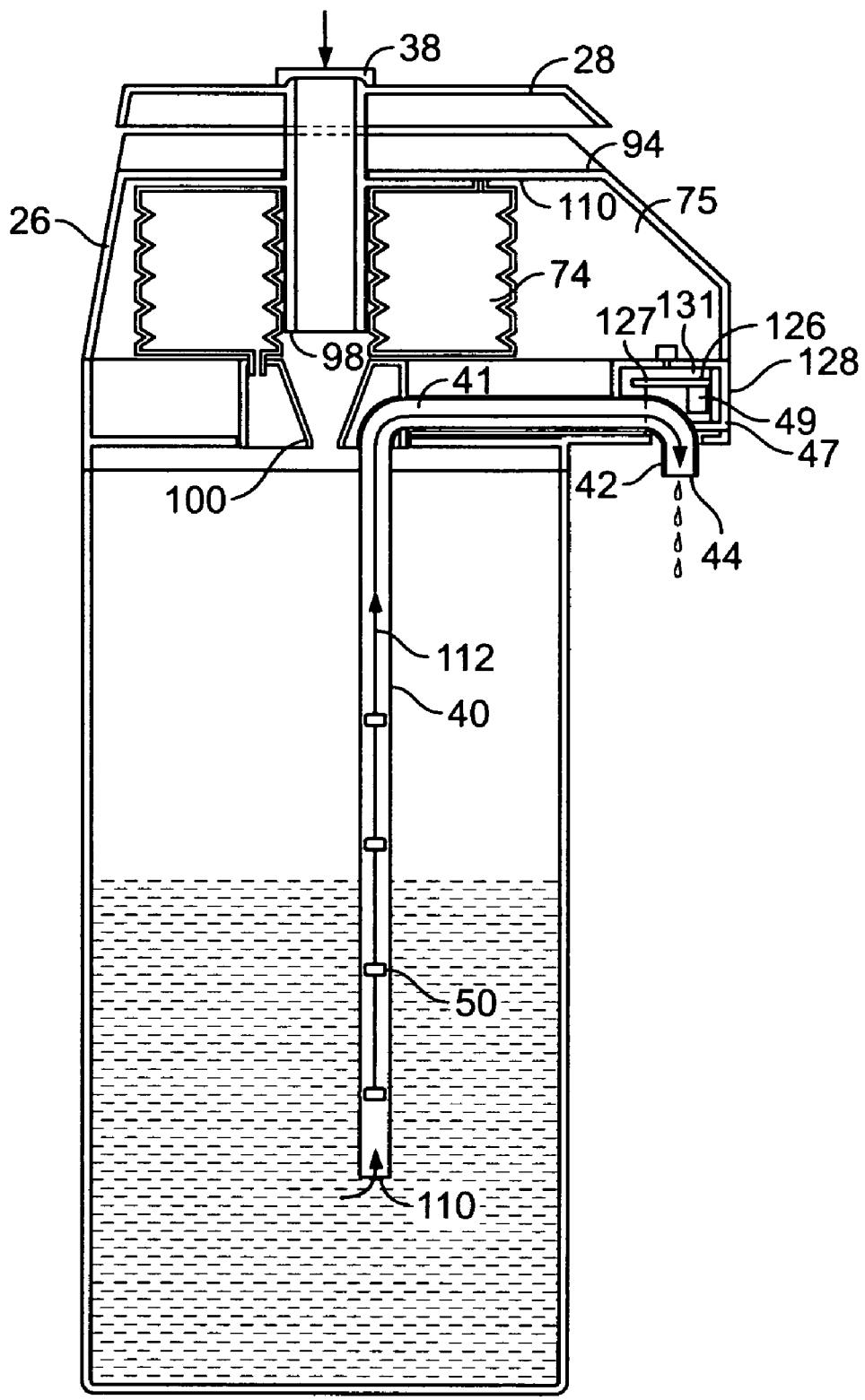
FIG. 5 is a sectional side view of the airpot beverage dispenser similar to that of FIG. 4 but with the dispenser removed from the brewer and with the dispenser actuator in moved from the brew position to an upper actuation position.
Figure 6:
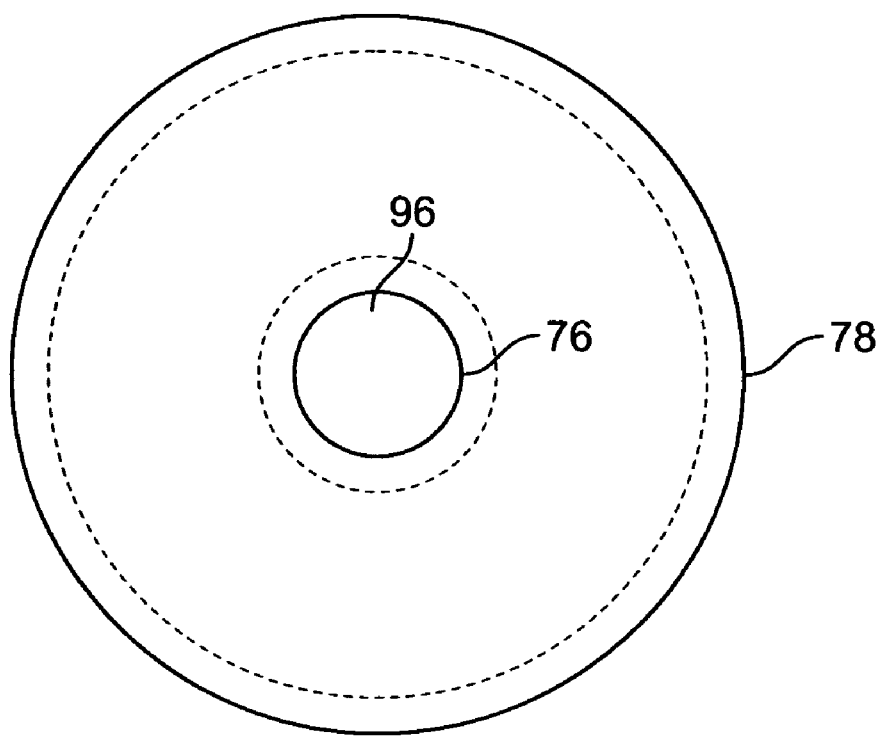
FIG. 6 is a plan view of the special annular, double-walled bellows of FIGS. 4 and 5.

As seen in FIGS. 1-3 and 4, the fixed cover 26 has a recess that conforms in shape with the movable cover 28 and within which is received the movable cover member when in the brew-through position. When the movable cover 28 is not held in the brew-through position, either by the latches 108, the bottom 62 of the brew basket 58, or both, then the resiliency of the bellows interior side wall 76 and the exterior side wall 78 will cause the top 80 to press upwardly against the bottom of the engagement collar 104 to slidably move the collar 104, the tubular body 90 and the movable cover 28 to move upwardly to the position shown in FIG. 5. The highest position is reached when the engagement collar is pressed against the bottom of the relatively lower central section 110 of the fixed cover 28, as shown in FIG. 5. In this highest position and positions between the highest position and the lowest, brew through position shown in FIG. 4, the top surface 32 of the movable cover 28 is no longer flush with the top surface of the fixed cover member 26 but is located above the fixed cover member 26. In the highest and intermediate relatively elevated positions, the bottom edge of the movable cover 28 is also raised above the uppermost surface of the relatively lower central section 110 of the fixed cover 26. The resiliency of the bellows may generally be relied upon to provide sufficient upward force for automatically moving the movable cover member 28 to the relatively elevated position when the movable cover is not locked or otherwise held in the brew-through position to increase the bellows body to a relatively larger volume than the reduced volume. However, as shown in FIG. 8, a separate spring or the like could also be used to exclusively provide or assist the bellows to provide such automatic upward movement.

In any event, there are a plurality of pumping positions spaced upwardly from direct brew-through position of FIG. 4 including the highest position shown in FIG. 5 and all of the intermediate positions. When it is desired to pressurize the interior 14, the movable cover 28 is manually forced downwardly from any of the pumping positions to reduce the volume of the bellows 74 and pressurize the interior 14. The greater the length of the downward stroke the greater the amount of air will be forced out of the bellows 74 and pumped into the interior. After the airpot is filled with beverage, the inlet 30 is closed with the inlet closure member 38 to reduce the loss of heat from within the interior 14, and the closure member 38 may remain in the closed position during this pumping action. Referring to FIG. 5, with sufficient pumping action, the beverage 36 will enter the inlet 110, rise up the dispense tube in the direction of arrow 112, traverse the horizontal section 41 of the tube and pass downwardly from the outlet end 45 of the spout 44.

Figure 16:
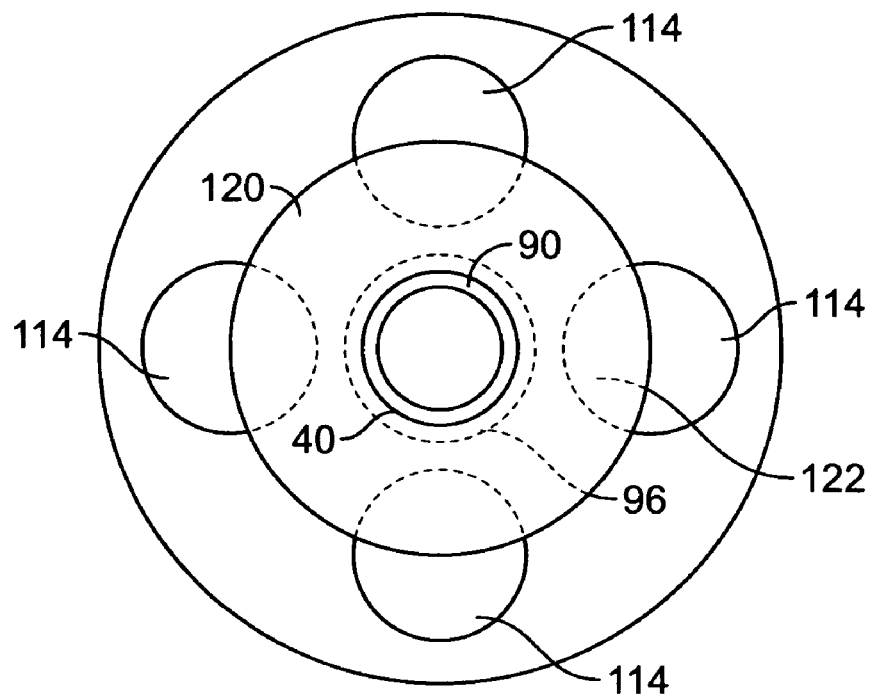
FIG. 16 is a plan view of another form of a bellows assembly that may be used in lieu of the double-walled, annular bellows of FIGS. 4-8.
Figure 17:
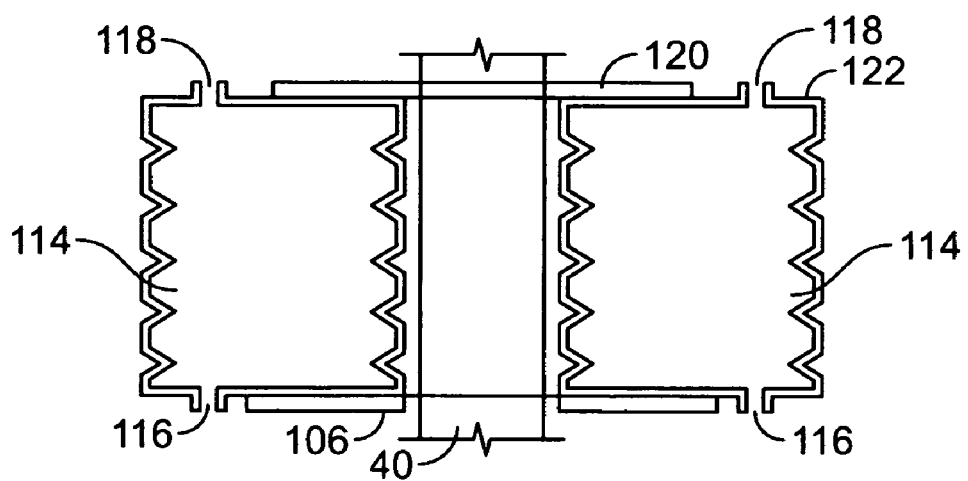
FIG. 17 is a side sectional view of the bellows assembly of FIG. 16.

Referring to FIGS. 16 and 17, in lieu of a single, double-walled bellows, 74 as shown in FIGS. 4 and 5, the bellows assembly may be formed of one or more single-walled bellows 114. The single-walled bellows 114 are laterally spaced from the brew-through passageway 96 and the feed tube, mounting hole 92. If a plurality of single-walled bellows 114 are used, then they are laterally spaced from each other as well as from the passageway 96, an preferably are located oppositely one another, if in pairs, and are evenly distributed and symmetrically arranged around the passageway 96. The bellows assembly includes at least another bellows body linked to the bellows actuator for distortion of the other bellows body concurrently with distortion of the one bellows body. Each of the plurality of bellows has an air outlet 116 that communicates with the interior 14 of the hollow body and may have a valve like valve 88, FIG. 7, which automatically closes except when air is being forced out of the outlet 116. The valve opens under conditions of differential pressure directed in the directions of opening movement of the valve. In addition, each of the bellows 114 has a relatively smaller air inlet 118 communicating with atmosphere and may be provided inlet valves, like inlet valve 85, FIG. 8. Preferably, the passageway 96 is centrally located and the dispense tube 40 carries a single, annular, or other symmetrical bellows engagement member 120. The symmetrical bellows engagement member 120 engages the tops 122 of all the plurality of single-walled bellows members 114 to enable simultaneous and coordinated actuation of all the bellows with a single actuator operating through the symmetrical engagement member 120. An advantage of using multiple, relatively small bellows relative to the use of a single relatively large bellows is that if one of the bellows should fail, the valve vents to atmosphere to enable the other bellows to continue to operate and enable continued dispensing. On the other hand, if the single bellows should fail, such as by a rift in its side that prevents it from pressurizing the interior, there is no backup mechanism to enable dispensing and the airpot becomes dysfunctional.

Figure 9:
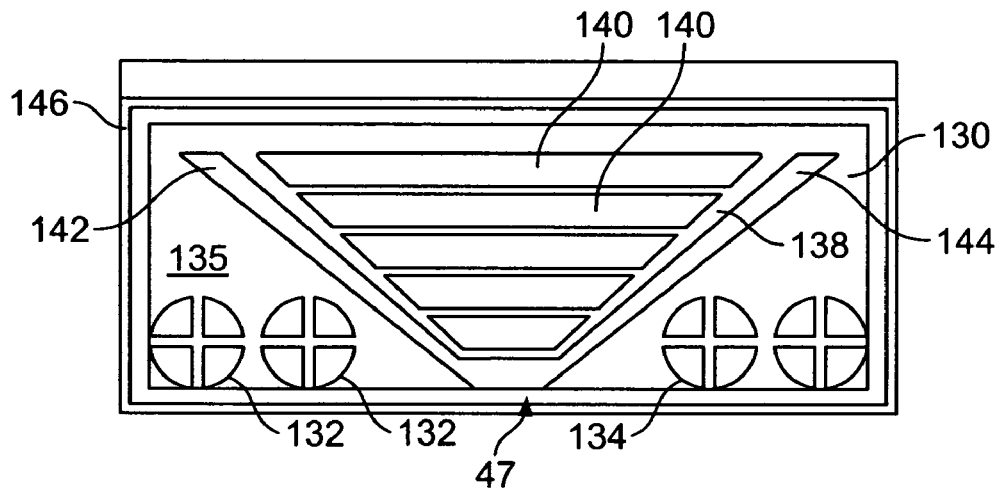
FIG. 9 is an enlarged front elevation view of the electronic display mounted to the airpot dispenser to display the beverage level, or quantity, and elapsed time since the dispenser received a fresh batch of freshly brewed beverage.
Figure 10:
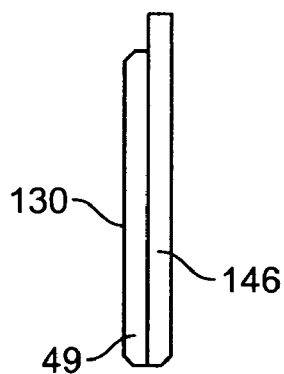
FIG. 10 is a side elevation view of the electronic display of FIG. 9.

Referring to FIG. 5, in addition to carrying the bellows 74 or bellows 114 and the bellows actuator, the cover assembly 24 also carries the electronic display 48 for indicating a plurality of different surface levels 46 of the beverage 36 within the hollow body 12. The electronic display 48 is carried within a forwardly located, watertight, protective electronics compartment 126 that is formed as part of the fixed cover 26. A forward facing wall 128 of the electronics compartment 126 is made of transparent plastic or impact resistant glass to enable viewing of the display face 130, FIGS. 9 and 10, when the display 48 is protectively enclosed within the compartment 126. Also, contained within the watertight compartment 126 are a display controller 127 and a portable source of electrical power 129, such as a battery or capacitor. The battery or capacitor may be recharged via photocells 131 carried at the face 30 of the display assembly 48. Alternatively, a small electrical generator, or dynamo, actuated by the movement of the bellows actuator or by the bellows themselves generates electrical power to recharge the battery. The display 48 is preferably an LCD display 49 with capability of displaying graphics on the display face 130, as shown in FIG. 9 that pictorially represent a plurality of different levels and a plurality of different elapsed times. The elapsed time is depicted by four identical circles 132 divided into four equal pie-shaped sections 134. Each circle 132 represents a different hour of elapsed time and each pie-shaped section represents one-fourth of the hour circle 132, or fifteen minutes. When the airpot beverage dispenser 20 is first filled, an elapsed timer is reset to zero and is actuated to start counting down from four hours. At the start, all of the circles 132 display all associated pie-shaped sections 134 in a dark color that contrasts with the relatively lighter background 135 of the display face 130, such as illustrated by the two hour circles 132 at the left side and the inner hour circle on the right side of the display face 130. After the lapse of the first fifteen minutes, then one of the sixteen pie-shaped quarter-hour section 134 is removed from the display face 30 to provide an empty space having the relatively lighter color of the background 135, such as empty space 136 at the hour circle 132 at the far right of the display face 130. For each additional fifteen minutes that passes, another pie-shaped quarter hour section is removed, i.e. changed to the same color as the background 135, until all quarter hour sections 134 have been removed at the end of sixteen quarter-hours, or four hours, has lapsed since the airpot beverage dispenser 20 is filled with freshly brewed beverage from brewer 70. As previously indicated, the start and reset of the time display is affected by actuation and then deactuation of the switch 66, FIG. 4. Alternatively, the an electronic level sensing assembly that senses a plurality of levels between the full and empty actuates the elapsed time timer when the level sensors first sense that the airpot beverage dispenser is full.

In addition to elapsed time, a graphic display 138 of the level of the beverage surface 46, or quantity of beverage, is provided by the display assembly. Preferably, this display is graphic in the form of a plurality, preferably approximately five, relatively dark, horizontal level indicator bars 140 arranged in an inverted triangular configuration within a fixedly displayed V-shaped graphic configuration 144, as shown in FIG. 9. When the beverage surface 46 is detected at or above the highest level, then all of the five horizontal level indicator bars 140 are visible. When the level of the surface 46 descends beneath the first detection level, the display of the uppermost and longest level indicator bar 46 is terminated, and the highest bar 140 is then the second lowest bars 140 shown in FIG. 9. Since this second bar 140 and lower bars 140 are beneath the highest point 142 of a V-shaped configuration 144, the display clearly indicates that the airpot dispenser 20 is not full when ever the top bar 140 or lower bars 140 are removed. As the level of the surface 46 continues to descend it successively passes beneath associated sensing levels. As each associated sensed level is passed, the associated bar 140 is removed from the display face 130. When the airpot beverage dispenser 20 is virtually empty, then the last of the bars 140 is removed, and all that remains is the fixedly displayed V-shaped graphic configuration. The display face the LCD display 49 is mounted to a circuit card 146 that carries printed circuitry for electrically interconnecting a male pin edge connector 148 that electrically connects with the portable power source energized electronic controller 128 responsive to level sensors 50.

Figure 11:
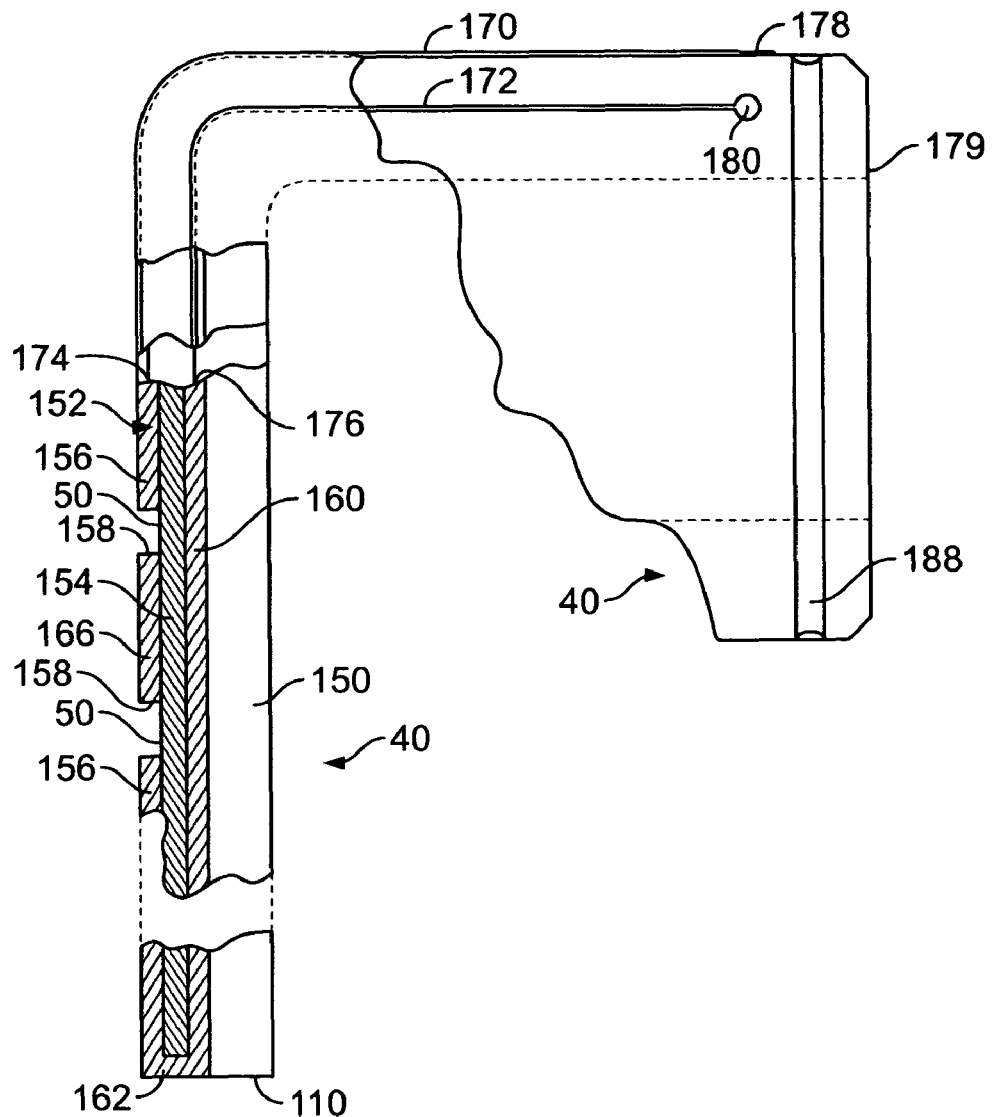
FIG. 11 is an side view, partially in section, of one form of the an L-shaped portion of the dispense tube assembly shown in FIGS. 1, 4 and 5.

Referring to FIG. 11, in one embodiment of the level sensor assembly a plurality of resistive sensors 50 are formed on and carried by a vertical portion of the feed tube 40. In such case, the dispense or feed tube 40 has a stainless steel inner body 150 with a surrounding wall assembly 152 on which electronic level sensing circuitry is formed. The surrounding wall assembly 152 has an inner layer 154 of relatively low resistance material, such a gold, steel, aluminum, or a low resistance composite or other relatively non-corrosive material that is covered on an outside surface by an outer layer 156 of relatively high resistance material except at a plurality of gaps 158 corresponding to the plurality of level sensors 50. An inside surface of the low resistance layer 154 is also covered continuously by a layer 160 of relatively high resistance material, such as ceramic material or inert alumina or the like. The relatively high resistance layer 160 has no gaps and is sandwiched between the inner layer 154 of relatively low resistance material and the outside surface 162 of the stainless steel body 150. The inner layer 160 is joined to the outer layer 156 of relatively high resistance material by a bottom section 162 at the inlet end 110 of the feed tube 40.

The outer surface of the relatively high resistance material layer 154 at the gaps 158 is exposed to and may make contact with the beverage 36. When the beverage 36 is in contact with the inner layer 154 at both of a pair of adjacent gaps 158, then beverage and the inner layer between the gaps 158 forms a relatively low resistance, or short circuit, electrical connection across the portion 164 of the section of the relatively high resistance outer layer 156, such as section 166 shown in FIG. 11.

Highly conductive leads 170 and 172 are connected respectively to the top 174 of the outer high resistance layer 156 and the top 176 of the inner high resistance layer 160. Both lead 170 and 172 are preferably protectively encased within the outer layer 156 between the upper ends 174 and 176 and distal ends of the conductive leads 170 and 172 that terminate at electrical contact pads 178 and 180. The pads 178 and 180 are located on the outside surface of the outermost layer of the horizontal section of the feed tube 40 adjacent an outlet end 179. The contact pads 178 and 180 are preferably printed or otherwise adhered to the outside surface to make contact with sensing circuitry. Alternatively, the leads are printed on the outside surface the entire length of the dispense tube between the ends 174 and 176 and the contact pads 178 and 180. Alternatively, the leads 170 and 172 are protectively buried within the outer relatively high resistance layer and then only pass to the pads 178 and 180 on the exterior adjacent the outlet end 179.

Figure 12:
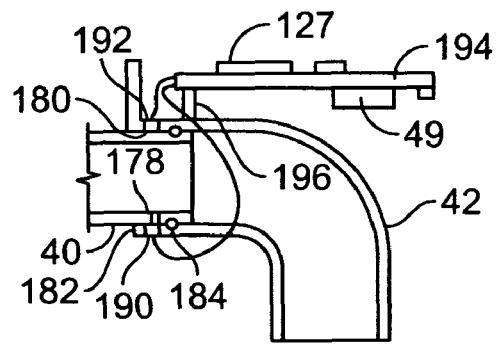
FIG. 12 is a side sectional view of a downwardly extending, outlet, or spout portion, of the dispense tube assembly that is fitted to the upper end of L-shaped portion of FIG. 11.

Referring to FIG. 12, the down-turned nozzle 42 has an inlet end 182 that fits over the outlet end of the dispense tube 40 and creates a water tight seal with an O-ring 184 that fits partly within an O-ring groove 186 at the outlet end 188 of the dispense tube. In addition the inlet end of the down-turned nozzle has a pair of mating electrical contacts 190 and 192 that make electrical contact with the contact pads 178 and 180, respectively, when the inlet end 182 is fully fitted over the outlet end 179 with the O-ring sealing the connection. The electrical contacts 190 and 192 are connected to the controller 127 that is carried on a circuit board 194 that, in turn, is attached to the down-turned nozzle 42 by a mounting bracket 196. The end of the circuit board 194 opposite the mounting bracket 196 carries a multipin electrical connector 198 for making connection of the controller 127 and the portable power supply 49 with the display 48. While the connection between the electrical contacts 190 and 192 and the circuit board 194 is illustrated by leads 200 and 202 for purposes of clear illustration, it should be appreciated that the actual connection may be carried by the bracket 196 and leads printed on or within the wall of the down-turned nozzle 42 that connect with printed circuit paths on the card 194.

Figure 13:
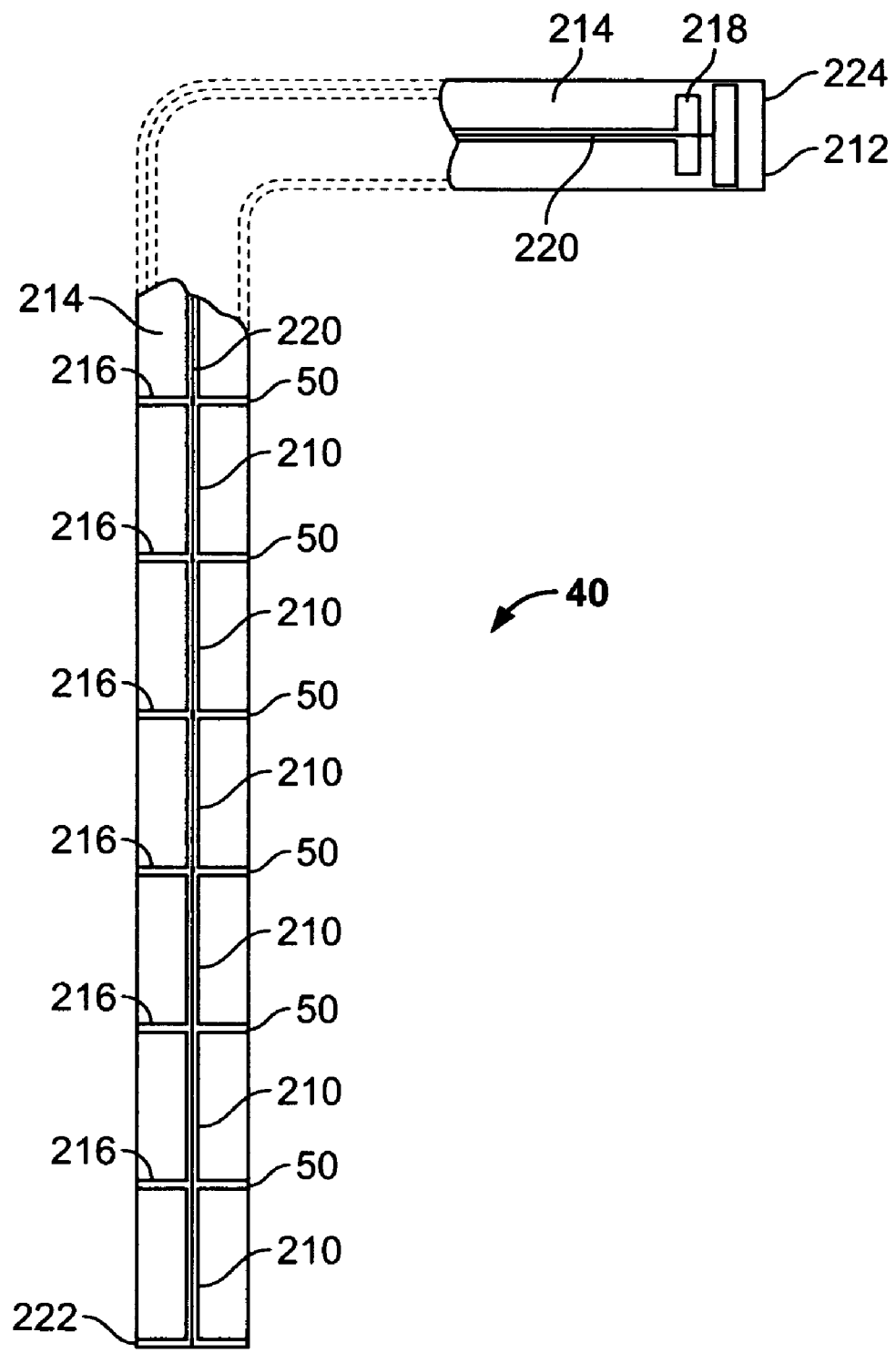
FIG. 13 is a side sectional side view of an alternative form of the L-shaped portion of the dispenser tube assembly of FIG. 11.
Figure 14:
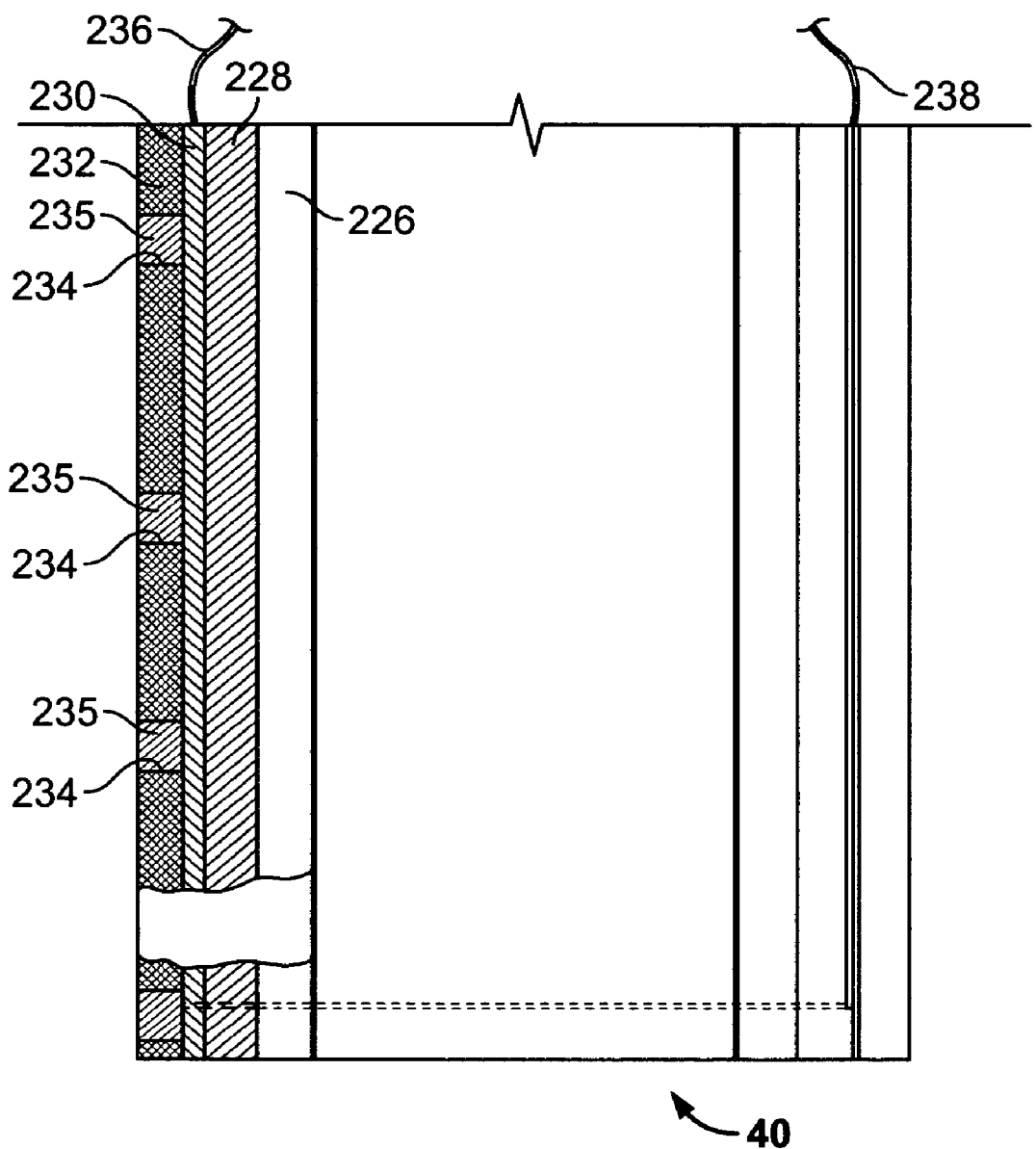
FIG. 14 is a side sectional view of another form of the L-shaped dispense tube assembly that may be used in lieu of the dispense tube assemblies of FIGS. 11-13.

Referring now to FIG. 13, another embodiment of the composite sensor assembly and dispense tube of FIG. 11 is shown in which there are six relatively high resistance segments 210 each having approximately one megaohm of resistance. These are applied to the exterior surface of an insulated stainless steel tube 212. The tubing has a 0.625 inch radius and a wall thickness of approximately 0.020 inch. The stainless steel tube 212 is covered by a layer 214 of insulating material, such as ceramic material, and the resistive segments 210 are printed on or otherwise adhered to the exterior surface of this insulated layer 214. Relatively highly conductive material bands 216 made of a suitably non-corrosive metal are wrapped around the tube 212 and make electrical contact with opposite ends of the relatively highly resistive segment 210 and thereby connect them in series circuit. One end of the series circuit is connected to an electrical contact pad 218 connected to a resistive element 220 extending from the highest conductive band 50 at the top of the highest resistive segment 210. The other end of the connection is made via a conductive band that electrically connects the interior of the stainless steel tube 212 to the bottom of the lowest resistive element 210 to enable the interior of the stainless steel tube 212 to carry the circuit to the outlet end 224 of the dispense tube 40. The length of the segments 210 may be approximately one inch, such that a range of detectable levels is approximately six inches. If a greater range is needed, either the number of segments 210 may be added, or the length of each segment is increased.

Referring now to FIG. 4, another embodiment of the composite level sensing dispense tube 40 is shown in which a stainless steel tube 226 is completely covered by a first layer 228. The insulating layer in turn, is covered by an intermediate layer 230 of relatively high resistive material. The resistive layer, in turn, is substantially covered by an outer layer 232 except at a plurality of equally spaced sensing portals 234 that are filled with cylindrical plugs 235 made of highly conductive material that is non-corrosive and relatively inert in the presence of a hot beverage, such a freshly brewed coffee or tea, such as gold. The connections of the two opposite ends of the resistive layer 228, schematically represented by leads 236 and 238, are connected to the controller 127 via suitable connectors such as disclosed above with reference to FIGS. 11,12 and 13.

Figure 15:
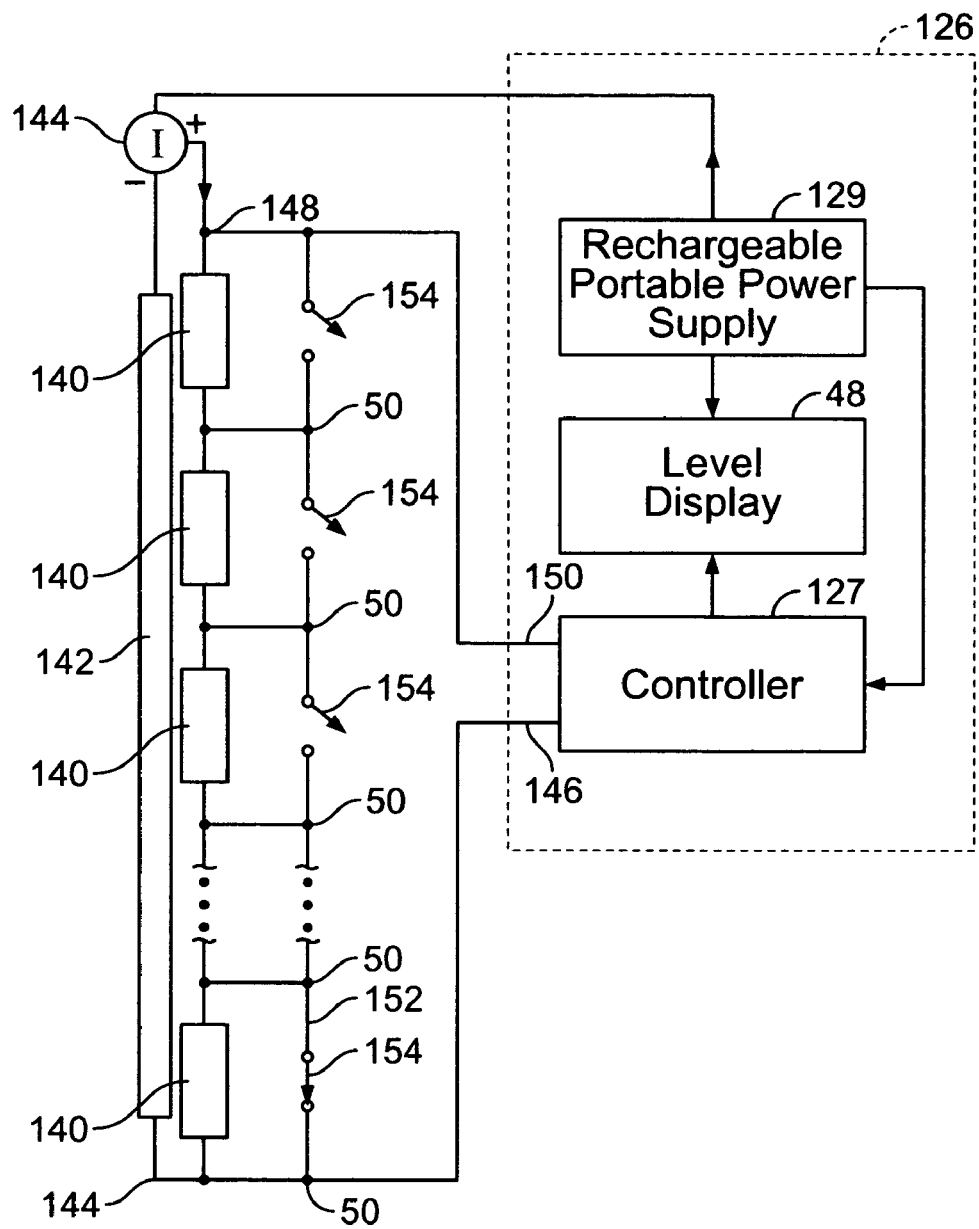
FIG. 15 is a schematic wiring diagram of the resistive level sensing circuits formed on and carried by the beverage dispense tube assembly and the remaining elements of the display circuitry.

Referring to FIG. 15, a circuit schematic of the plural level sensing dispense tube 40 described above is seen to have a plurality of resistive elements 140 that are connected in series circuit with each other and a resistive element 142 between a current source 144. The junction 144 between the resistive element 142 and the series connection of resistive elements 140 is connected to one input 146 of the controller 127 and the junction 148 of the series circuit connection of resistive elements 140 is connected to another input 150 of the controller. The voltage drop across the pair of inputs 150 and 146 is proportional to the ratio of total of the resistances of all of the series connected resistive elements 140, or Rs to the sum of the resistance of the resistive element 142, or Rf, and Rs, or Rf+Rs. Thus, the voltage drop is proportional to the ratio: Rs/(Rf+Rs). The exact voltage depends upon the strength of the current source 144. When the liquid beverage rises, it first contacts the lower-most sensor 50 and then the second highest sensor 50 and so on. A potential short circuit 152 in parallel with each of the resistive elements 140 exists as represented by single-pole, single-throw switches 152. When the sensors 50 on opposite sides of any one of the resistive elements are both in contact with the beverage 36, then the resistive element is shorted out of the series circuit of resistive element 140, and its resistance is no longer additive to the total series resistance Rs. This short circuit is schematically represented by the associated switch 154 being in a closed position, such as illustrated by the lowermost switch 154. When the airpot 10 is first filled with beverage, all of the sensors 50 are in contact with the beverage 36 and all of the resistive elements 140 are shorted out, i.e. all of the switches 154 are closed. The voltage drop across the inputs 150 and 146 is then approximately zero because the value of Rs is approximately zero. As the level falls, eventually the two sensors at opposite ends of the highest resistive element 154 are free from contact with the beverage then the switch 154 across the uppermost resistive element 140 is opened and the total series resistance Rs becomes the resistance of the top resistive element, or Re, and the voltage becomes proportional to Re/(Re+Rf). After the beverage falls beneath the third highest sensor 50, the voltage across the controller inputs becomes (Re+Re)/(Re+Re+Rf), or 2Re/(2Re+Rf). This pattern continues with each successive exposure of a sensor 50 resulting in another change in the level sensing voltage appearing across the controller inputs 150 and 146. When the second lowest sensor, i.e. the sensor located between the lowest resistive element 140 and the second lowest resistive element is uncovered, the sensor voltage reaches the greatest value of 6Rs/(6Rs+Rf), presuming there are six resistive elements 140. Preferably, each of the series resistors 140 has a resistance of 1-megaohm and the fixed resistor has a resistance of 6-megaohms. Presuming a voltage supply of 9-volts D.C., the range of voltage is from zero to 4.5 volts D.C. calculated as [(6-megaohms)/(6-megaohms+6-megaohms)]×9-volts D.C. This changing voltage is detected by the controller 127 and converted to a representation of beverage level that is graphically depicted on the display 47.

Figure 18:
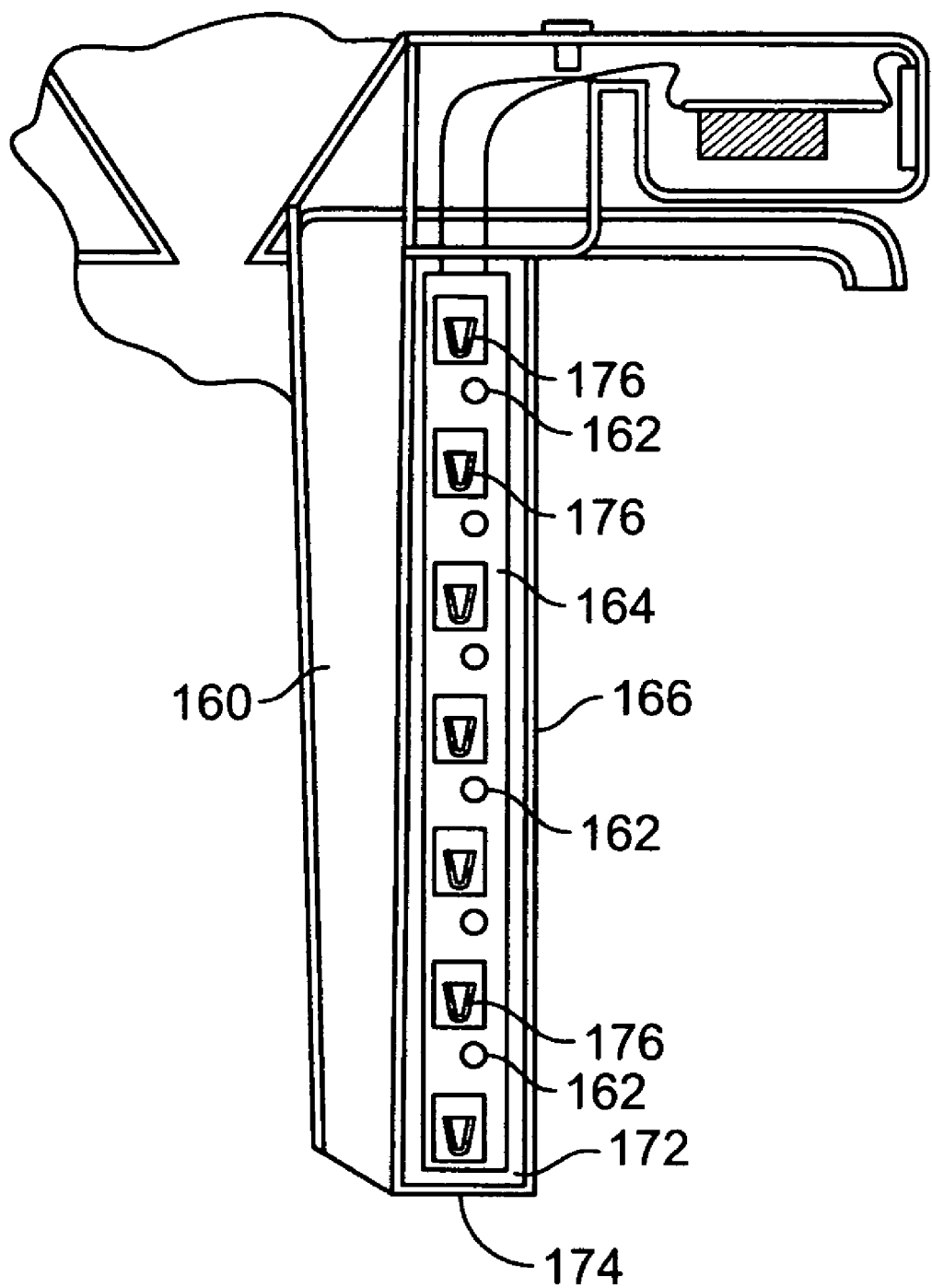
FIG. 18 is another side sectional view of another form of the dispense tube assembly in which a capacitive level sensor is employed in lieu of the resistive level sensing circuits of the dispense tube assemblies of FIGS. 11-15.
Figure 20:
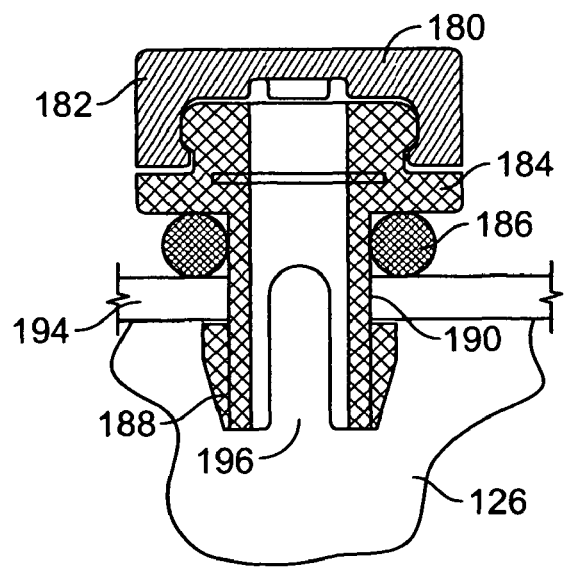
FIG. 20 is a sectional side view of a vent that is used to vent the interior of an electronics compartment within which is protectively mounted a controller, a source of portable electrical power, and connections to the electronic display.

Referring now to FIGS. 18 and 20, another embodiment of the composite, dual-function level sensing dispense tube assembly 40 is shown in which capacitive sensor are mounted along the length of and carried by a dispense tube body 160. Instead of the sensors 162 being carried on the very surface of the dispense tube body, the dispense tube assembly 40 of FIGS. 18 and 20 has a plurality of sensors 162 mounted equally spaced along the length of an elongate circuit card 164 which, in turn is carried within a special elongate watertight sensor compartment 166. The elongate sensor compartment is attached to and preferably integrally formed from plastic with the dispense tube body 160. The sensors 162 are capacitive sensor elements in the form of capacitive plates that are pressed against the right side wall 168 of the compartment 166 and form a capacitor with the beverage when the beverage 36 is located at the same level as and opposite the capacitive sensor elements 162.

The right side wall 168 and the left sidewall 170 are tapered downwardly and inwardly toward each other to facilitate easy insertion, and correct and secure vertical alignment of circuit card 164 during assembly. The separation of the walls 168 and 170 is widest at the top to provide a wide opening to enable easy sliding insertion of the distal end 172 of the card 164 into the top. The narrow distance between the walls at the bottom 174 of the compartment 166 blocks further downward movement when the card is fully inserted. The card carries a plurality of cantilevered bias springs 176, respectively associated with and located respectively adjacent the plurality of capacitive sensor elements 162 to resiliently force the circuit card 164 away from the tapered wall 170 and toward the tapered wall 168. This advantageously presses the capacitive sensor elements 162 against the tapered wall 168 in order to maintain a fixed and uniform distance between the outermost surfaces of the capacitive sensor elements 162 and the outside surface of the wall 168 at which contact with the beverage 36 is made. Because the walls 168 and 170 are tapered, the bias springs 176 are of different length and extend laterally from the card 164 to the wall 170. As the springs 176 are located at increasingly higher levels from the bottom of the card 164, the lengths of the distances that the bias springs 176 extend laterally from the card 164 to the wall 170 increase to maintain a uniform pressure needed to maintain a uniform and fixed distance between the sensor elements 162 and the beverage 36 after the card 164 is mounted within the water tight compartment 166. This importantly improves accuracy and reliable of the reading obtained from the sensors 162.

Figure 19:
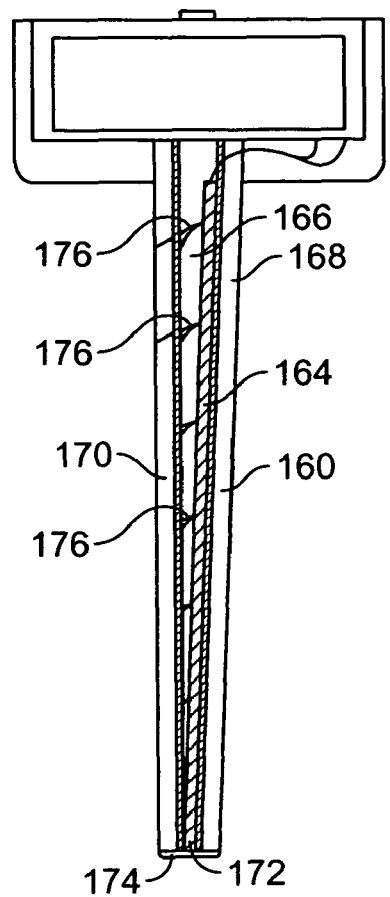
FIG. 19 is a sectional front elevation of the dispense tube assembly of FIG. 18 illustrating resilient positional members mounted to a circuit board to uniformly hold capacitive sensing plates against an interior side of a special elongate housing attached to the dispense tube and within which the circuit board is protectively mounted.

There are many different capacitive sensor circuits employing capacitors as sensing elements that may be used in conjunction with the sensor assembly of FIGS. 18 and 19. All of them depend on the fact that the capacitance of a capacitive circuit changes as the material or lack of material between the "plates" of the capacitor changes with changes in beverage level, or one of the plates, in the form of a beverage, moves in and out of position adjacent and opposite the plate of the capacitive sensor. Preferably, the capacitive sensing circuit is substantially the same as shown and described in Polish patent application Ser. No. P-358, 634, filed Feb. 2, 2003, by Zbigniew Szela, Kazimierz Zajac, Wlodzimierz Kalita, Zbigniew Lassota and Michal Lassota, which is hereby incorporated by reference and PCT application based on and claiming priority from this Polish patent and designating the United States, PCT application number PCT/PL2004/000003, filed Jan. 21, 2004, entitled "Electronic Method and System for Detection of Conductivity in Dielectric Environment with Dielectric Constant Higher Than That of Air", which are hereby incorporated by reference.

Alternatively, the capacitive sensor circuitry is like one or more of the capacitive level sensing circuits shown in one or more of the following U.S. Pat. Nos. 2,354,945 issued Aug. 1, 1944 to Cohen et al. for 'liquid level Sensitivity Apparatus and 4,433,577 issued Feb. 28, 1984 to Khurgin et al. for "Apparatus for Metering Liquid Flow"; 6,505,509 issued Jan. 14, 2003 to Gualtieri for "Apparatus and Method for Measuring the Level of a Fluid"; and 6,539,797 issued Apr. 1, 2003 to Livingston et al. for "Auto-compensating Capacitive Level Sensor", all of which are hereby incorporated by reference.

The invention contemplates the use of other types of electrical levels sensors other than those based on series or parallel resistive circuits or capacitive sensors. Theses different types of level sensor circuits include the use of RF liquid-air discontinuity sensing such as shown in U.S. Pat. No. 5,249,463 issued Oct. 5, 1993 to Wilson et al. for "Measurement of Liquid Level"; the use of a plurality of thermocouples for detecting changes in temperature at different levels such as shown in U.S. Pat. No. 6,546,796 issued Apr. 15, 2003 to Zimmermann et al. for "Liquid Level Sensor"; the use of a plurality of photosensor such as shown in U.S. patent issued Dec. 24, 1996 to Vogel et al. for "Water Purification and Dispensing Systems"; the use of sonic pulses, or sonar, to detect a plurality of different levels such as shown in U.S. Pat. No. 3,115,615 issued Dec. 24, 1963 to Saper for "Measuring Systems"; the use of an optical fiber or other type of strain gauge or the like such as shown in U.S. Pat. No. 6,703,635 issued Mar. 9, 2004 to Yashiro et al for "Method and Apparatus for Measuring the level of Liquid Using Optical Fiber Strain Gauge"; through the use of pressure sensing or differential pressure sensing such as shown in U.S. Pat. No. 6,164,325 issued Dec. 26, 2000 to Braun for "Fuel Tank of a Motor Vehicle and a Level Metering Device for the Fuel Tank"; by measuring the changing weight of the inner liner as the quantity of beverage changes by means of a built-in weight measuring device such as a strain gauge such as shown in U.S. Pat. No. 4,360,128 issued Nov. 23, 1982 to Neumann for "Beverage Dispenser Having Timed Operating Period Responsive to Reservoir Quantity"; sensing of movement of a float that moves with movement of the surface level of the beverage via magnetic sensing such as described in U.S. patent application Publication No. 203/0066431 A1 published Apr. 10, 2003 of Fanzutti et al. for "Coffee Maker" and shown in PCT International Publication No. WO 01/59411 A1 published Aug. 16, 2001 of Keller for "Method and Apparatus for Monitoring Liquid Level in a Container"; the use of radar for detecting to distance to the beverage surface level from the top of the airpot dispenser, such as shown in U.S. Pat. No. 6,684,697 issued Feb. 3, 2004 to Westerling et al for "Radar Antenna"

The sensors may also include one or more of an electrical inductor with an inductance that varies with changes in the quantity of beverage within the hollow body, a plurality of thermocouples for sensing the temperature within the interior of the hollow body at a plurality of different locations, an infrared sensor for sensing the sensing the infrared emissions from within the interior of the hollow body, a photo-optical sensor for sensing the presence of beverage at a plurality of levels, a light sensor employing fiber optic fibers, a pressure sensor for sensing the hydraulic pressure adjacent the bottom of the interior of the hollow body. Other types of sensors will occur to those skilled in the art.

In the case of the use of resistors, instead of a straight voltage divider circuit as described above the resistive sensing circuit may include a resistive bridge circuit with four legs and the total resistance of the beverage contained within the interior form at least part of the resistance of one of the four legs. In such case, the resistive bridge circuit has a variable set point at which the bridge is balanced and means for changing the set point to a series of set points associated with a plurality of different quantities of beverage contained within the interior of the hollow body.

In the case of an inductive sensor circuit at least one inductor is used with an inductance that varies with changes in the quantity of beverage within the hollow body due to a change in the dielectric constant of the core of the inductor. The inductor has a partially hollow core that is positioned for receipt of beverage within the core to alter the inductance of the inductor dependent upon the level of the beverage relative to the hollow core. The hollow core is elongate and substantially vertically oriented and extends between two different levels within the interior of the hollow body corresponding to different quantities of beverage. Preferably, the hollow core extends between a level corresponding to the maximum quantity capable of being displayed and a level associated with the lowest level capable of being displayed by the display means. Alternatively, the hollow core has a relatively short vertical expanse and is associated with one of a plurality of beverage levels corresponding to one of the plurality of different quantities that are capable of being displayed by the display means The hollow core is substantially filled with beverage when the beverage is above the associated level and otherwise being substantially filled with air when the beverage is beneath the associated level.

In the case of the electronic level sensing circuit being a plurality of thermocouples for sensing temperature associated with the quantity of beverage within the interior of the hollow body at a plurality of different locations, respectively associated with a plurality of different quantities. Preferably, the plurality of thermocouples are arranged in spaced vertical relationship at a plurality of different vertical levels associated with a plurality of different quantities of beverage contained within the interior of the hollow body. The thermocouples are located within the interior of the hollow body and preferably are carried by the dispense tube to facilitate removal and connection to the display.

In the case of the electronic level sensing circuit employing an infrared sensor for sensing the sensing the infrared emissions from within the interior of the hollow body the infrared sensors detects a difference in temperature associated with at least one of a change in level of a top surface of beverage in the container, and a change in the total quantity of beverage contained within the container. Again the plurality of infrared sensor may be carried by the dispense tube and includes a plurality of infrared light sensors arranged in vertical spaced relationship and respectively associated with a plurality of different levels of beverage within the interior of the hollow body. There may be a focusing element for focusing on an infrared sensor array infrared light emitted along the entire height of the interior of the hollow body.

In the case of the electronically level sensing circuit includes an RF transmitter, the transmitter transmits information concerning top surface level of the beverage within the interior of the hollow body. Preferably, a plurality of RF transponders located at a plurality of different possible levels of beverage within the interior of the hollow body are provided and the transponders are enabled when actuated to transmit a unique transponder depending upon the level of the beverage relative to the location of the transponder. In such case, preferably the display actuating means includes an RF receiver for receiving RF signals from the transponders to determine the level of beverage within the interior of the hollow body. A plurality of different codes respectively representative of the plurality of levels at which the RF transmitters are located are transmitted In the case of the level sensing circuit uses sonar, a sonar transceiver provides a signal representative of the distance from the transceiver to a top surface of the beverage within the interior of the container. Preferably, the sonar transceiver is located adjacent either the top or the bottom of the airpot dispenser and directed in a vertical direction. Alternatively, a plurality of sonar receivers arranged in vertical spaced relationship within the interior of the hollow body an directed in a horizontal direction for detecting different speeds of sound depending upon whether the signal is passing through the beverage or not.

If the electronically sensing means includes a source of light for illuminating the interior of the hollow body and a photo-detector for detecting light within the interior, there may be a plurality of photodetectors with a plurality of fiber optic cables for passing light to the photo-detectors from a plurality of vertically spaced locations, respectively, within the interior and respectively associated with a plurality of different possible levels of beverage within the interior.

If the level sensing circuit uses a pressure sensor, the pressure sensor detects the hydraulic pressure adjacent the bottom of the interior of the hollow body. This may be achieved by provision of a member associated with the liner that is dimensionally altered and this alteration is sensed by a strain gauge. The strain gauge is attached to the interior liner and may be located between the outer housing and the liner.

In the case of the use of radar sensing, a radar transceiver is mounted to the top of the hollow body for detecting the relative location of the top surface of the beverage, and thus may be easily removed from the airpot dispenser and connected to the display and display controller.

Referring now to FIGS. 4,5, 18 and 19, if the watertight chamber 126 is formed from plastic then a vent 180 is provided. The vent 180 vents the interior to atmosphere of any damaging built up of moisture or other contaminants that might gradually accumulate within the chamber 126 to prevent damage to the enclosed electronic components. The vent 180 has a cover 182, a bottom 184 and an O-ring 186. The bottom has a downwardly extending snap-fit mounting member 188 that is snap fit downwardly into a mating mounting hole 190. Shoulders 192, acting against the bottom surface of the upper wall 194 of the housing 126, hold the O-ring 186 pressed against the top surface to insure a good seal. A vent passageway 196 in the bottom 184 extends from the interior of the watertight compartment 126 and to the exterior through an oleophobic membrane 198 mounted within and closing the vent passageway 196 except for permitted venting. The vent 180 is preferably a Pre-Vent® Univent Membrane Vent made, preferably made of Polyamide with a 40-degree Shore A Neoprine O-ring and an air flow At dp=70 mbar (1 psi) of 10-50 ml/min, such as Pre-Vent Univent Part No. VE0005GSV made by W. L. Gore & Associates, Inc of Newark, Del.

While a particular embodiment of the invention has been disclosed in detail, persons of ordinary skill in the art will be aware of functional equivalents of many of the elements that may be substituted for those disclosed in detail and it should be appreciated that many variations may be made without departing from the spirit and scope of the invention as defined in the appended claims.

The invention claimed is:

1. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body with a central opening mounted to the cover body, the brew-through passageway being substantially centrally located relative to the hollow body surrounding sidewall and passing through a central opening in the bellows body, and a bellows actuator linked to the bellows body for distorting the bellows to pressurize the interior of the hollow body.

2. The airpot beverage dispenser of claim 1 in which the bellows body is laterally spaced from the brew-through passageway.

3. The beverage dispenser of claim 1 in which
   the bellows body has a vertically movable top surface, and
   the bellows actuator includes
      a hollow tubular member defining the brew-through passageway mounted for sliding movement within the passageway, and
      a bellows engagement member laterally extending from the tubular member and in overlying relationship with the movable top surface to move the movable top surface when the tubular member is slid downwardly within the passageway.

4. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which
   the bellows body has an annular, double-walled construction with an exterior wall surrounding an interior wall that surrounds the beverage brew-through passageway.

5. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which
   the bellows assembly includes another bellows body that is laterally spaced from both the one bellows body and the passageway.

6. The airpot beverage dispenser of claim 5 in which the one bellows body and the other bellows body are located on opposite sides of the passageway.

7. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which the bellows assembly includes a plurality of other bellows bodies, which together with the one bellows body, are symmetrically arranged around and laterally spaced from the passageway.

8. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which the bellows assembly includes at least another bellows body linked to the bellows actuator for distortion of the other bellows body concurrently with distortion of the one bellows body.

9. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which the bellows has an air outlet that communicates with the interior of the hollow body and has a valve for closing the outlet except when air is passing out of the bellows though the air outlet.

10. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which the brew-through passageway includes an interior, non-movable interior funnel with an outlet for passing beverage into the interior of the hollow body.

11. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which the cover assembly includes
 a protective housing for the bellows assembly with
  a bottom, a top spaced from the bottom, and a surrounding side wall,
  an interior beverage outlet opening in the bottom for passing beverage from the passageway into the interior, and
  an inlet opening in the top through which the passageway extends.

12. The airpot beverage dispenser of claim 11 in including a tubular member mounted for sliding vertical movement within the inlet opening and having an upper end defining the exterior brew-through inlet and an outlet end received within the protective housing and in fluid communication with the interior.

13. The airpot beverage dispenser of claim 12 in which the cover assembly includes a movable cover member attached to the upper end of the tubular member and surrounding the brew-through inlet.

14. The airpot beverage dispenser of claim 13 in which
the cover body includes a fixed section with a fixed cover top, and
the movable cover member is vertically, slidably movable between a brew through-position in which a top surface of the movable cover is substantially flush with the fixed cover top and a relatively elevated position in which the top surface of the movable top is located above the fixed cover top.

15. The airpot beverage dispenser of claim 14 in which the fixed cover top has a recess that conforms in shape with the movable cover and within which is received the movable cover member when in the brew-through position.

16. The airpot beverage dispenser of claim 14 including means for releasably locking the movable cover member in the brew position.

17. The airpot beverage dispenser of claim 16 including means for automatically moving the movable cover member to the relatively elevated position when the movable cover is not locked in the brew-through position to increase the bellows body to a relatively larger volume than the reduced volume.

18. The airpot beverage dispenser of claim 11 in which the cover assembly has a movable member linked to the bellows actuator including means for releasably locking the movable cover in the brew position.

19. The airpot beverage dispenser of claim 18 including means for automatically moving the movable cover assembly to the relatively elevated position when the movable cover is not locked in the brew-through position to increase the bellows body to a relatively larger volume than the reduced volume.

20. The airpot beverage dispenser of claim 18 in which the movable cover member carries the bellows actuator and movement of the movable cover member to the brew position moves the bellows actuator to diminish the bellows body to a relatively reduced volume.

21. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly mounted to the top and having a cover body for substantially closing the open top except for a brew-through passageway substantially smaller than the open top and extending between an upwardly facing exterior brew-through inlet and an interior outlet; and a bellows assembly carried by the cover assembly for pressurizing the interior of the insulated hollow body, said bellows assembly including a bellows body mounted to the cover body and a bellows actuator linked to the bellows body for distorting the bellows to pressurize the interior of the hollow body, and in which the cover assembly has a top surface with the exterior brew-through inlet through which the passageway extends and includes an upwardly extending collar surrounding the brew-through inlet opening, said collar extending upwardly from the top surface for mating relationship with a beverage dispense opening of a brewer to guide freshly brewed beverage into the brew-through opening.

22. The airpot beverage dispenser of claim 21 in which the cover assembly has a movable section and the top surface in which the brew-through inlet is formed is a top surface of the movable section and including means for mounting the movable cover section between a brew position in which the brew-though opening is facing substantially upwardly for direct receipt of freshly brewed beverage when the insulated body is located at a direct brew-through position of a brewer, and a plurality of pumping positions spaced from the direct brew position, said bellows actuation member being attached to the movable cover section to translate movement between said plurality of pumping positions to pumping movement of the bellows to pump air into the insulated body.

23. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:

a cover assembly with a cover carrying the bellows and a bellows actuator;

an electronic display for indicating a plurality of levels of the beverage within the hollow body;

an electronic level sensing assembly with a level sensing probe with multiple level sensing locations at a plurality of different levels for sensing a plurality of different levels of beverage within the hollow body, respectively; and means for communicating level sensing information from the electronic level sensing assembly to the electronic level display for selective display of the plurality of different levels of beverage within the hollow body.

24. The airpot beverage dispenser of claim 23 in which the electronic sensing assembly is attached to a vertical portion of the dispense tube and includes one (a) a capacitive sensor, and (b) a resistive sensor.

25. The airpot beverage dispenser of claim 23 in which the dispense tube is made of stainless steel with an insulated coating on which electronic level sensing circuitry is formed.

26. The airpot beverage dispenser of claim 23 in which the dispense tube has a tubular body with a surrounding wall formed from an inner layer of relatively low resistance material covered by an outer layer of relatively high resistance material except at a plurality of gaps through which electrical connection may be made between beverage within the interior and the relatively low resistance gap.

27. The airpot beverage dispenser of claim 26 in which the tubular body includes another inner layer of relatively high resistance material substantially continuously covering an interior side of the inner layer of relatively low resistance material.

28. The airpot beverage dispenser of claim 27 including another interior layer of relatively rigid, stainless material that is substantially continuously covered by the other inner layer of relatively high resistance material.

29. The airpot beverage dispenser of claim 28 in which the other interior layer of relatively rigid, stainless material is stainless steel and provides most of the structural strength of the dispense tube.

30. The airpot beverage dispenser of claim 28 in which the material of relatively high resistance material and the other inner layer of relatively high resistance material is one of (a) ceramic, and (b) material having ceramic-like electrical and non-corrosive characteristics.

31. The airpot beverage dispenser of claim 30 in which the material of the inner layer of relatively low resistance material is one of (a) stainless steel, (b) another metal, (c) a composite material having metal-like electrical conductivity characteristics.

32. The airpot beverage dispenser of claim 26 in which the relatively high resistance material of the outer layer is one of (a) ceramic, and (b) material having ceramic-like electrical and non-corrosive characteristics.

33. The airpot beverage dispenser of claim 32 in which the material of the inner layer of relatively low resistance material is one of (a) stainless steel, (b) another metal, (c) a composite material having metal-like electrical conductivity characteristics.

34. The airpot beverage dispenser of claim 26 in which the material of the inner layer of relatively low resistance material is one of (a) stainless steel, (b) another metal, (c) a composite material having metal-like electrical conductivity characteristics.

35. The airpot beverage dispenser of claim 26 including a plurality of plugs filling the plurality of gaps made of one of (a) gold, (b) aluminum, (c) stainless steel, and (d) any other material of relatively low resistance material.

36. The airpot beverage dispenser of claim 23 in which the dispenser tube is made of metal and the communicating means includes an electronic level sensing controller and a nonmetalic coating upon which is printed at least one relatively conductive lead interconnecting a plurality of level sensing elements carried by the dispense tube and the controller.

37. The airpot beverage dispenser of claim 26 in which the electronic level sensing assembly includes a plurality of capacitive sensor plates carried in spaced relationship along the dispense tube to sense the presence of beverage at a plurality of levels, respectively.

38. The airpot beverage dispenser of claim 37 including an elongate watertight compartment attached along the dispense tube within which the capacitor sensor plates are protectively enclosed.

39. The airpot beverage dispenser of claim 38 in which the elongate water tight compartment has a wall with an exterior surface exposed to the beverage and an interior surface located opposite the exterior surface and the capacitor sensing plates are in contact with the interior surface.

40. The airpot beverage dispenser of claim 39 including means for resiliently pressing the capacitor sensor plates against the interior surface.

41. The airpot beverage dispenser of claim 39 in which the resilient pressing means includes a single circuit board, means for mounting the capacitive sensor plates to one side of a circuit board and means for mounting the resiliently pressing means an opposite side of the circuit board to press the one side of the circuit board and the capacitive sensor plates against the interior surface.

42. The airpot beverage dispenser of claim 41 in which the elongate watertight housing has another interior surface spaced oppositely from the one interior surface and the resiliently pressing means presses against and away from the other interior surface to press the capacitive elements against the one interior surface.

43. The airpot beverage dispenser of claim 42 in which the other interior surface is tapered upwardly and away from the one interior surface of the watertight compartment and the resilient pressing means includes a plurality of resilient members of varying lengths and at different levels to accommodate varying spacing of the interior surfaces at the different levels.

44. The airpot beverage dispenser of claim 41 in which the resilient pressing means includes a plurality of springs located along the dispense tube on a side of the circuit board opposite the side to which the capacitor sensor plates are mounted.

45. The airpot beverage dispenser of claim 23 in which the cover assembly includes a brew-through opening to enable beverage to be brewed directly into the interior of the hollow body without first moving the cover assembly away from the open top.

46. The airpot beverage dispenser of claim 45 in which the cover assembly includes a protective housing containing between a top and a bottom a bellows for pressurizing the interior of the hollow body and carrying an actuator with a manually engagable exterior member for moving the bellows.

47. The airpot beverage dispenser of claim 46 including a brew-through passageway passing through the protective housing from an inlet at the top and an outlet at the bottom.

48. The airpot beverage dispenser of claim 46 in which the cover assembly includes
a watertight electronics compartment for protectively mounting an electronic display controller and a portable power supply, and
means for carrying the electronic level sensing assembly in level sensing relationship within the interior of the hollow body.

49. The airpot beverage dispenser of claim 48 in which the elongate member is a tube for dispensing beverage out of the interior of the hollow body.

50. The airpot beverage dispenser of claim 49 in which the elongate member has a generally horizontal section carrying conductors for connecting the level sensing assembly with the communicating means and means carried by the cover assembly for mounting the horizontal section near the water tight compartment to make connection between the conductors and the communicating means.

51. The airpot beverage dispenser of claim 49 in which the watertight compartment includes means for mounting the electronic display and electrical connections between the display and the communicating means.

52. The airpot beverage dispenser of claim 51 in which the communicating means includes a microcomputer based controller interconnected between the electronic level sensing assembly conductors and the electronic display.

53. The airpot beverage dispenser of claim 23 in which the communicating means includes a microprocessor programmed to interpret signals from the electronic level sensing assembly to control the electronic display to display one of a plurality of different quantities of beverage corresponding to the level sensed by the multiple level sensing locations at the plurality of different levels of the electronic level sensing assembly.

54. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:
a cover assembly with a cover carrying the bellows and a bellows actuator;
an electronic display for indicating a plurality of levels of the beverage within the hollow body, the electronic level sensing assembly including a battery powered electronic circuit for operating the electronic display, and a water tight electronics compartment defined by part of the cover for protectively housing the battery powered electronic operating circuit;
an electronic level sensing assembly for sensing a plurality of different levels of beverage within the hollow body; and
means for communicating level sensing information from the electronic level sensing assembly to the electronic level display.

55. The airpot beverage dispenser of claim 54 in which the digital display is mounted to an outside front of the cover adjacent the watertight electronics compartment and faces laterally forwardly for reading from in front of the hollow body.

56. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:
a cover assembly with a cover carrying the bellows and a bellows actuator;
an electronic display for indicating a plurality of levels of the beverage within the hollow body;
an electronic level sensing assembly for sensing a plurality of different levels of beverage within the hollow body including
an elongate member mounted to and extending downwardly into the interior of the hollow body to a plurality of levels, and
means carried along the length of the elongate member for sensing the plurality of levels; and
means for communicating level sensing information from the electronic level sensing assembly to the electronic level display.

57. The airpot beverage dispenser of claim 56 in which the elongate member is a tube for dispensing beverage out of the interior of the hollow body and has a horizontal section.

58. The airpot beverage dispenser of claim 57 including means for passing the horizontal section near the watertight electronics compartment to pass electrical connections from the electronic level sensing assembly into the electronics compartment.

59. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:
a cover assembly with a cover carrying the bellows and a bellows actuator;
an electronic display for indicating a plurality of levels of the beverage within the hollow body;
an electronic level sensing assembly for sensing a plurality of different levels of beverage within the hollow body; and
means for communicating level sensing information from the electronic level sensing assembly to the electronic level display, the communicating means including means for radio wave transmitting information from the electronic level sensing assembly to the electronic display.

60. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through assembly, comprising:
a cover assembly with a cover carrying the bellows and a bellows actuator, the cover including an electronics compartment made of plastic and means for venting the plastic compartment to atmosphere;
an electronic display for indicating a plurality of levels of the beverage within the hollow body;
an electronic level sensing assembly for sensing a plurality of different levels of beverage within the hollow body; and
means for communicating level sensing information from the electronic level sensing assembly to the electronic level display.

61. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through cover assembly, comprising:
a cover fitted to the open top with a housing protectively enclosing means to pressurize the interior of the hollow body, an electronic beverage level display, a display controller responsive to an electronic level sensor for controlling the electronic display and a portable source of electrical power for the display and the controller;
a direct-brew passageway passing through the housing with an exterior inlet located at a top surface of the housing and an interior outlet at a bottom surface of the housing and in fluid communication with the interior of the hollow body; and
means carried by the cover for manually actuating the pressurizing means.

62. The airpot beverage dispenser of claim 61 including
means for electronically sensing the quantity of beverage within the interior of the hollow body, and
means for mounting the electronic sensing means to the cover.

63. The airpot beverage dispenser of claim 61 in which the cover has a top surface and the electronic display has a face that is directed in a lateral direction to enable viewing from a position beneath the top surface.

64. The airpot beverage dispenser of claim 61 in which the direct brew passageway is defined by a tubular member mounted for vertical movement within a mating mounting hole in the top of the cover.

65. The airpot beverage dispenser of claim 61 in which the brew-through cover assembly includes means for releasably detaching the cover from the open top to enable cleaning of the interior of the hollow body.

66. The airpot beverage dispenser of claim 61 in which the pressurizing means includes a bellows mounted within the housing and manually engagable through an engagement member mounted to the cover for movement relative to the cover.

67. The airpot beverage dispenser of claim 61 including means for mounting the dispense tube to the cover for removal from the interior of the hollow body with removal of the cover from the open top.

68. The airpot beverage dispenser of claim 61 in which the electronic level sensor is mounted to the cover and includes one of (a) a capacitive sensor, and (b) a resistive sensor.

69. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through cover assembly, comprising:
a cover fitted to the open top with a housing protectively enclosing means to pressurize the interior of the hollow body, an electronic beverage level display, a display controller responsive to an electronic level sensor for controlling the electronic display and a portable source of electrical power for the display and the controller;
a direct-brew passageway passing through the housing with an exterior inlet located at a top surface of the housing, and an interior outlet at a bottom surface of the housing and in fluid communication with the interior of the hollow body, the direct brew passageway being defined by a tubular member mounted for vertical movement within a mating mounting hole in the top of the cover, an inlet end of the tubular member being attached to a movable cover member in which the brew-through beverage inlet is formed, and said cover having a recess within which the movable cover member is received when the movable cover is moved to a brew position; and means carried by the cover for manually actuating the pressurizing means.

70. The airpot beverage dispenser of claim 69 in which the pressurizing means includes a bellows within the housing and in which the tubular member carries an engagement member for pressing against the bellows when the tubular member is moved downwardly.

71. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through cover assembly, comprising:

a cover fitted to the open top with a housing protectively enclosing means to pressurize the interior of the hollow body, an electronic beverage level display, a display controller responsive to an electronic level sensor for controlling the electronic display and a portable source of electrical power for the display and the controller;

a direct-brew passageway passing through the housing with an exterior inlet located at a top surface of the housing and an interior outlet at a bottom surface of the housing and in fluid communication with the interior of the hollow body;

means carried by the cover for manually actuating the pressurizing means, and an upwardly standing collar surrounding the exterior inlet for guiding beverage from a brewer directly into the beverage inlet.

72. The airpot beverage dispenser of claim 71 including a cap releasably attached to the collar to selectively close the brew-through inlet after the end of a brew cycle.

73. In an airpot beverage dispenser with an insulated hollow body having an interior defined by a bottom, an open top and a surrounding sidewall joining the top to the body, a dispense tube with an exterior outlet adjacent the top and an interior inlet located adjacent the bottom for passing beverage from adjacent the bottom to the outlet when the interior of the hollow body is pressurized, the improvement being a brew-through cover assembly, comprising:

a cover fitted to the open top with a housing protectively enclosing means to pressurize the interior of the hollow body, an electronic beverage level display, a display controller responsive to an electronic level sensor for controlling the electronic display and a portable source of electrical power for the display and the controller, the electronic level sensor being mounted to the dispense tube;

a direct-brew passageway passing through the housing with an exterior inlet located at a top surface of the housing and an interior outlet at a bottom surface of the housing and in fluid communication with the interior of the hollow body; and means carried by the cover for manually actuating the pressurizing means, means for mounting the dispense tube to the cover for removal from the interior of the hollow body with removal of the cover from the open top.

74. In an airpot beverage dispenser with an insulated hollow body having, a bottom, an open top and a surrounding sidewall joining the open top to the bottom, a laterally extending, downwardly facing spout outside of the hollow body and a dispense tube with an outlet connected to the spout and an inlet within the hollow body and located adjacent the bottom for passing beverage from adjacent the bottom to the spout, the improvement, comprising:

a cover assembly mounted to the open top of the hollow body and including an upwardly facing, centrally located brew-through beverage inlet passageway passing through the cover and having a centrally located, upwardly facing, beverage inlet substantially smaller than that of the open top of the hollow body, and means for mounting the dispense tube and the spout at a location laterally spaced from the centrally located brew-through beverage inlet passageway; and means for mounting the cover assembly to top of the hollow body.

75. The airpot of claim 74 including an electronic display, a sensor of an actual condition of the beverage within the hollow body located within the hollow body including a plurality of different levels of beverage, and means for controlling the electronic display in response to the sensor to show an indication of the actual condition sensed by sensor including a plurality of different levels.

76. The airpot of claim 75 in which the actual condition of the beverage sensed by the sensor and shown on the display is both the temperature and the plurality of different levels of the beverage.

77. A method of serving freshly brewed beverage from an airpot, comprising the steps of:

locating the airpot at a brew position with a brew-through inlet opening in an upper most surface of a closed cover assembly of the airpot positioned adjacent to and aligned with a beverage outlet of the brewer to directly receive freshly brewed beverage into the airpot;

passing beverage from the beverage outlet directly into a hollow body of the airpot through the brew-through inlet and a brew-through passageway defining the brew-through inlet and slidably mounted to the cover assembly while the cover is closed; and serving beverage at the serving location from a spout located outside of the hollow body and connected with a dispense tube within the hollow body by actuating a bellows by manually sliding the brew-through passageway against the bellows to relatively pressurize the hollow body;

closing the brew-through inlet before moving the airpot to a serving location and after the step of passing has been completed by the steps of manually moving a closure cap movably mounted to the cover between a closed position in which the brew-through inlet is blocked by the cap, and an open brew-through position in which the inlet is unblocked.

78. The method of claim 77 including the step of
closing communication of the brew-through inlet with the hollow body after the beverage has been passed into the hollow body.

79. The method of claim 77 including the step of closing the brew-through inlet before moving the airpot to a serving location and after the step of passing has been completed.

80. The method of claim 77 in which the bellows body is annular with a central passageway, and the step of passing includes the step of passing beverage through the central passageway and past and through the bellows.

81. The method of claim 77 including the steps of
electronically measuring the amount of beverage in the hollow body at the serving location, and
displaying the amount of beverage on an electronic display.

82. The method of claim 77 including the steps of electronically measuring the amount of beverage in the hollow body with one of (a) a temperature sensor, and (b) a capacitive sensor, and displaying the amount on an electronic display attached to the hollow body.

83. A method of serving freshly brewed beverage from an airpot, comprising the steps of:
locating the airpot at a brew position with a brew-through inlet opening in an upper most surface of a closed cover assembly of the airpot positioned adjacent to and aligned with a beverage outlet of the brewer to directly receive freshly brewed beverage into the airpot;
passing beverage from the beverage outlet directly into a hollow body of the airpot through the brew-through inlet opening in the closed cover while the cover is closed;
moving a closure cap between
a closed position in which the brew-through inlet is blocked by the cap, and
a brew through position in which the inlet is unblocked; and
serving beverage at the serving location from a spout located outside of the hollow body and connected with a dispense tube within the hollow body by actuating a bellows to relatively pressurize the hollow body.

84. The method of claim 83 in which the closure member is movably mounted to the cover assembly.

85. A method of serving freshly brewed beverage from an airpot, comprising the steps of:
locating the airpot at a brew position with a brew-through inlet opening in an upper most surface of a closed cover assembly of the airpot positioned adjacent to and aligned with a beverage outlet of the brewer to directly receive freshly brewed beverage into the airpot;
passing beverage from the beverage outlet directly into a hollow body of the airpot through the brew-through inlet opening in the closed cover while the cover is closed; and
serving beverage at the serving location from a spout located outside of the hollow body and connected with a dispense tube within the hollow body by actuating a bellows to relatively pressurize the hollow body, and in which
the hollow body has an open top, and
the closed cover assembly is fixedly mounted to the hollow body to maintain a fixed position relative to the hollow body to permanently close the open top except for the brew-through inlet when open.

86. A method of serving freshly brewed beverage from an airpot, comprising the steps of:
locating the airpot at a brew position with a brew-through inlet opening in an upper most surface of a closed cover assembly of the airpot positioned adjacent to and aligned with a beverage outlet of the brewer to directly receive freshly brewed beverage into the airpot;
passing beverage from the beverage outlet directly into a hollow body of the airpot through the brew-through inlet opening in the closed cover while the cover is closed; and
serving beverage at the serving location from a spout located outside of the hollow body and connected with a dispense tube within the hollow body by actuating a bellows to relatively pressurize the hollow body, and in which
the bellows has a double-wall construction with a central passageway, and
the step of passing includes the step of passing beverage from the brew-through inlet and into and through the central passageway and into the hollow body.

87. A method of serving freshly brewed beverage from an airpot, comprising the steps of:
locating the airpot at a brew position with a brew-through inlet opening in an upper most surface of a closed cover assembly of the airpot positioned adjacent to and aligned with a beverage outlet of the brewer to directly receive freshly brewed beverage into the airpot;
passing beverage from the beverage outlet directly into a hollow body of the airpot through the brew-through inlet opening in the closed cover while the cover is closed; and
serving beverage at the serving location from a spout located outside of the hollow body and connected with a dispense tube within the hollow body by actuating a bellows to relatively pressurize the hollow body, and in which
the step of passing includes the step of passing the beverage through a gap between the one bellows and another bellows spaced from the one bellows.

88. In an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, the improvement being a method of electronically displaying an actual condition of the beverage within the hollow body, comprising the steps of:
closing the open top of the hollow body assembly with a cover assembly carrying a bellows and a bellows actuator;
indicating with an electronic display the level of the beverage within the hollow body;
sensing with an electronic level sensing assembly a plurality of different levels of beverage within the hollow body; and
linking the electronic level sensing assembly to the electronic level display.

89. In an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, the improvement being a method of electronically displaying an actual condition of the beverage within the hollow body, comprising the steps of:
closing the open top of the hollow body assembly with a cover assembly carrying a bellows and a bellows actuator;

indicating with an electronic display the level of the beverage within the hollow body;

sensing with an electronic level sensing assembly a plurality of different levels of beverage within the hollow body; and linking the electronic level sensing assembly to the electronic level display, and in which the electronic level sensing assembly includes a battery powered electronic circuit for operating the electronic display, and including the step of protectively housing the battery powered electronic operating circuit in a water tight electronics compartment defined by part of the cover.

90. In an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, the improvement being a method of electronically displaying an actual condition of the beverage within the hollow body, comprising the steps of:

closing the open top of the hollow body assembly with a cover assembly carrying a bellows and a bellows actuator;

indicating with an electronic display the level of the beverage within the hollow body;

sensing with an electronic level sensing assembly a plurality of different levels of beverage within the hollow body; and linking the electronic level sensing assembly to the electronic level display, and which the digital display is mounted to an outside front of the cover adjacent the watertight electronics compartment and faces laterally forwardly for reading from in front of the hollow body.

91. In an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, the improvement being a method of electronically displaying an actual condition of the beverage within the hollow body, comprising the steps of:

closing the open top of the hollow body assembly with a cover assembly carrying a bellows and a bellows actuator;

indicating with an electronic display the level of the beverage within the hollow body;

sensing with an electronic level sensing assembly a plurality of different levels of beverage within the hollow body; and linking the electronic level sensing assembly to the electronic level display, and in which the step of sensing includes the step of electronically sensing with one of (a) a capacitive sensor, and (b) a resistive sensor attached to a vertical portion of the feed-tube.

92. In an airpot beverage dispenser with an insulated hollow body having a bottom, a top and a surrounding sidewall joining the top to the body, a spout and an elongate feed tube extending downwardly into the hollow body with an outlet connected to the spout within the insulated body and an inlet located adjacent the bottom for passing beverage from adjacent the bottom to the spout, the improvement being a method of electronically displaying an actual condition of the beverage within the hollow body, comprising the steps of:

closing the open top of the hollow body assembly with a cover assembly carrying a bellows and a bellows actuator;

indicating with an electronic display the level of the beverage within the hollow body;

sensing with an electronic level sensing assembly a plurality of different levels of beverage within the hollow body; and linking the electronic level sensing assembly to the electronic level display, and in which the feed-tube is made of stainless steel with an insulated coating on which the electronic level sensing circuitry is printed.

93. In an airpot beverage dispenser with an insulated hollow body having, a bottom, a top and a surrounding sidewall joining the top to the body, a spout and a feed tube with an outlet connected to the spout within the insulated body and an inlet located adjacent the bottom for passing beverage from adjacent the bottom to the spout, the improvement being a method of serving freshly brewed beverage, comprising the steps of:

keeping the open top of the hollow body substantially closed with a cover assembly mounted to the top and having a cover carrying a bellows; and moving a bellows actuation member lever with a brew-through inlet opening for direct passage of freshly brewed beverage directly into the hollow insulated body to a brew position in which the brew-though opening is facing substantially upwardly for direct receipt of freshly brewed beverage from a beverage outlet of a brewer;

passing freshly brewed beverage from the beverage brewer through the brew-through inlet opening when the actuation member is in the brew position;

after the step of passing, serving beverage out of the spout by moving the actuation member between the direct brew position and at least one pumping position to pressurize the insulated hollow body to force beverage upwardly through the feed-tube and out of the spout.

94. The method of claim 93 including the step of keeping the inlet opening closed prior to, and after, the step of serving with the inlet closure cap.

95. In an airpot beverage dispenser with an insulated hollow body having, a bottom, a top and a surrounding sidewall joining the top to the body, a spout and a feed tube with an outlet connected to the spout within the insulated body and an inlet located adjacent the bottom for passing beverage from adjacent the bottom to the spout, the improvement being a method of serving freshly brewed beverage, comprising the steps of:

keeping the open top of the hollow body substantially closed with a cover assembly mounted to the top and having a cover carrying a bellows; and moving a bellows actuation member lever with a brew-through inlet opening for direct passage of freshly brewed beverage directly into the hollow insulated body to a brew position in which the brew-though opening is facing substantially upwardly for direct receipt of freshly brewed beverage from a beverage outlet of a brewer;

passing freshly brewed beverage from the beverage brewer through the brew-through inlet opening when the actuation member is in the brew position;

after the step of passing, serving beverage out of the spout by moving the actuation member between the direct brew position and at least one pumping position to pressurize the insulated hollow body to force beverage upwardly through the feed-tube and out of the spout, and in which the bellows has a bellows body with
- a double-walled construction, and
- a beverage passageway with an inlet located in aligned relationship with the brew-through inlet opening and extending through the bellows body, and including the step of
- passing beverage received from the flow-through inlet through the beverage passageway extending through the bellows body and into the insulated hollow body.

96. In an airpot beverage dispenser with an insulated hollow body having, a bottom, a top and a surrounding sidewall joining the top to the body, a spout and a feed tube with an outlet connected to the spout within the insulated body and an inlet located adjacent the bottom for passing beverage from adjacent the bottom to the spout, the improvement being a method of serving freshly brewed beverage, comprising the steps of:

keeping the open top of the hollow body substantially closed with a cover assembly mounted to the top and having a cover carrying a bellows; and moving a bellows actuation member lever with a brew-through inlet opening for direct passage of freshly brewed beverage directly into the hollow insulated body to a brew position in which the brew-though opening is facing substantially upwardly for direct receipt of freshly brewed beverage from a beverage outlet of a brewer;

passing freshly brewed beverage from the beverage brewer through the brew-through inlet opening when the actuation member is in the brew position;

after the step of passing, serving beverage out of the spout by moving the actuation member between the direct brew position and at least one pumping position to pressurize the insulated hollow body to force beverage upwardly through the feed-tube and out of the spout, and including another bellows linked to the bellows actuation member and spaced from the one bellows to provide a passageway between the one bellows and the other bellows that is aligned with the brew-through inlet opening, and including the step of passing beverage from the brew-through inlet opening past the one bellows and the other bellows and into hollow insulated body.

* * * * *